United States Patent [19]

McCormick-Goodhart

[11] Patent Number: 4,501,487

[45] Date of Patent: Feb. 26, 1985

[54] MICROFICHE RECORDING APPARATUS AND METHOD WITH STATIONARY FILM HEAD

[75] Inventor: Mark H. McCormick-Goodhart, Grosse Point, Mich.

[73] Assignee: Energy Conversion Devices, Inc., Troy, Mich.

[21] Appl. No.: 523,341

[22] Filed: Aug. 15, 1983

[51] Int. Cl.³ .................. G03B 27/32; G03B 27/52
[52] U.S. Cl. ........................ 355/27; 355/43; 355/54; 355/77; 430/8
[58] Field of Search .............. 355/19, 27, 51, 54, 355/45, 75, 123, 53, 77, 43; 346/76 L; 430/8, 500, 501, 644

[56] References Cited

U.S. PATENT DOCUMENTS

| | | | |
|---|---|---|---|
| 3,966,317 | 6/1976 | Wacks et al. | 355/19 |
| 4,123,157 | 10/1978 | Klose et al. | 355/45 X |
| 4,137,078 | 1/1979 | Izu et al. | 346/76 L X |
| 4,325,629 | 4/1982 | Ogata et al. | 355/27 |
| 4,332,466 | 6/1982 | Flasck | 355/27 |
| 4,344,701 | 8/1982 | Klose et al. | 355/51 |
| 4,348,104 | 9/1982 | Ovshinsky | 355/45 |
| 4,355,890 | 10/1982 | Klose et al. | 355/54 |
| 4,360,265 | 11/1982 | Lewis | 355/75 X |
| 4,360,579 | 11/1982 | Klose et al. | 355/123 X |
| 4,410,265 | 10/1983 | Ovshinsky | 355/51 |

Primary Examiner—Richard A. Wintercorn
Attorney, Agent, or Firm—Lawrence G. Norris

[57] ABSTRACT

A simplified microfiche recording apparatus and method is provided that images a light image reflected through a fixed mirror train from hard copy or other source in microimage size on an intermediate dry-process film, develops the microimage and transfers the microimage by contact printing to an archival microfiche film. Stations are provided for imaging, developing and transferring which are in fixed relation to each other along a stationary intermediate film head. Single frame advancement of the intermediate film is utilized from station to station, where suitable, to avoid fogging of the intermediate film by insuring that the portion of the intermediate film which is subject to light piping from the transferring station contains developed microimage. A read station is provided to allow reading and-/or annotating microimages recorded on the microfiche film utilizing a read lens, the optical axis of which is shifted to allow an image to be projected from the microimage film through the read lens and the same mirror train utilized for intermediate film exposure. The read station is in fixed relation to the intermediate film head and imaging developing and transferring stations.

14 Claims, 34 Drawing Figures

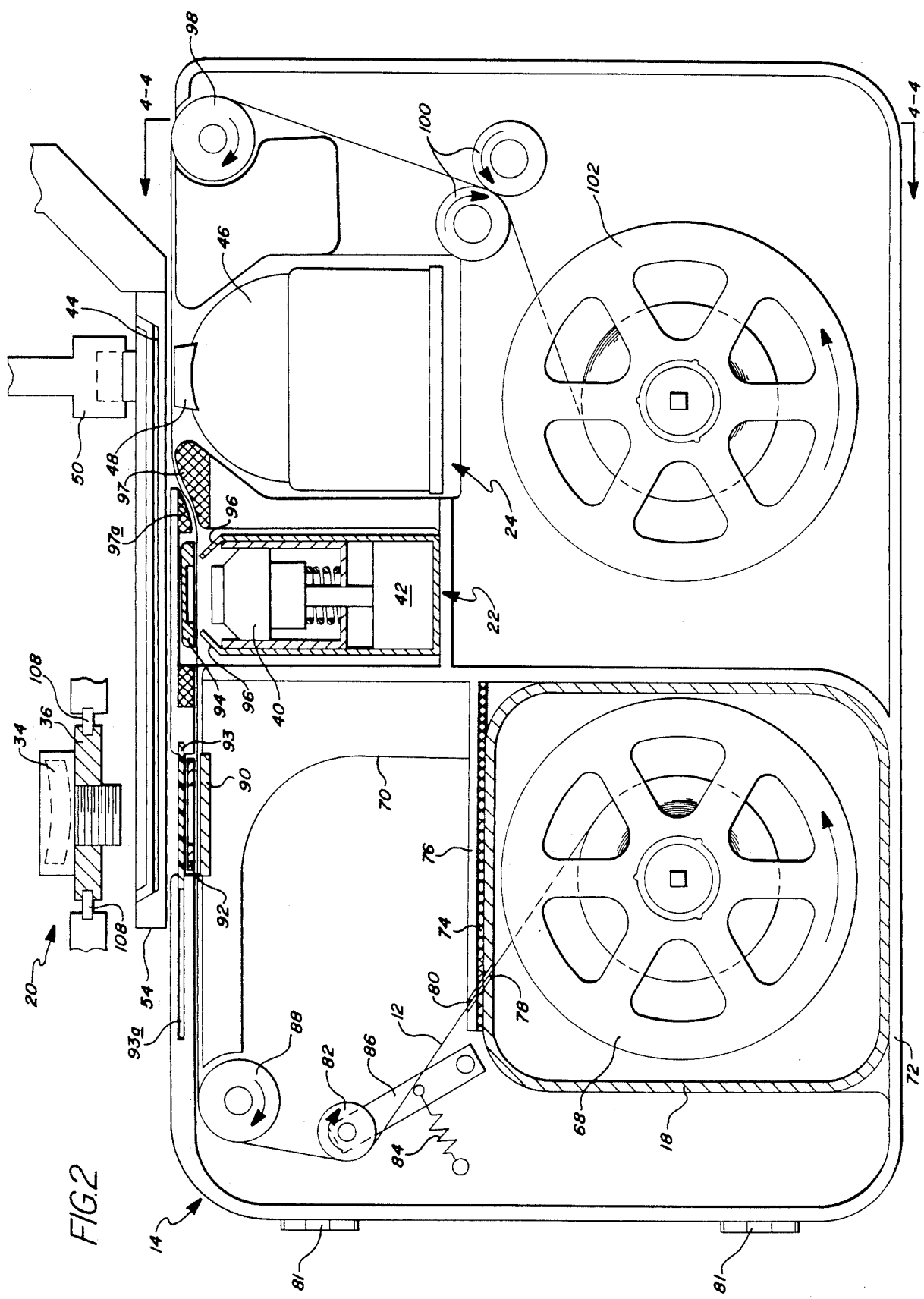

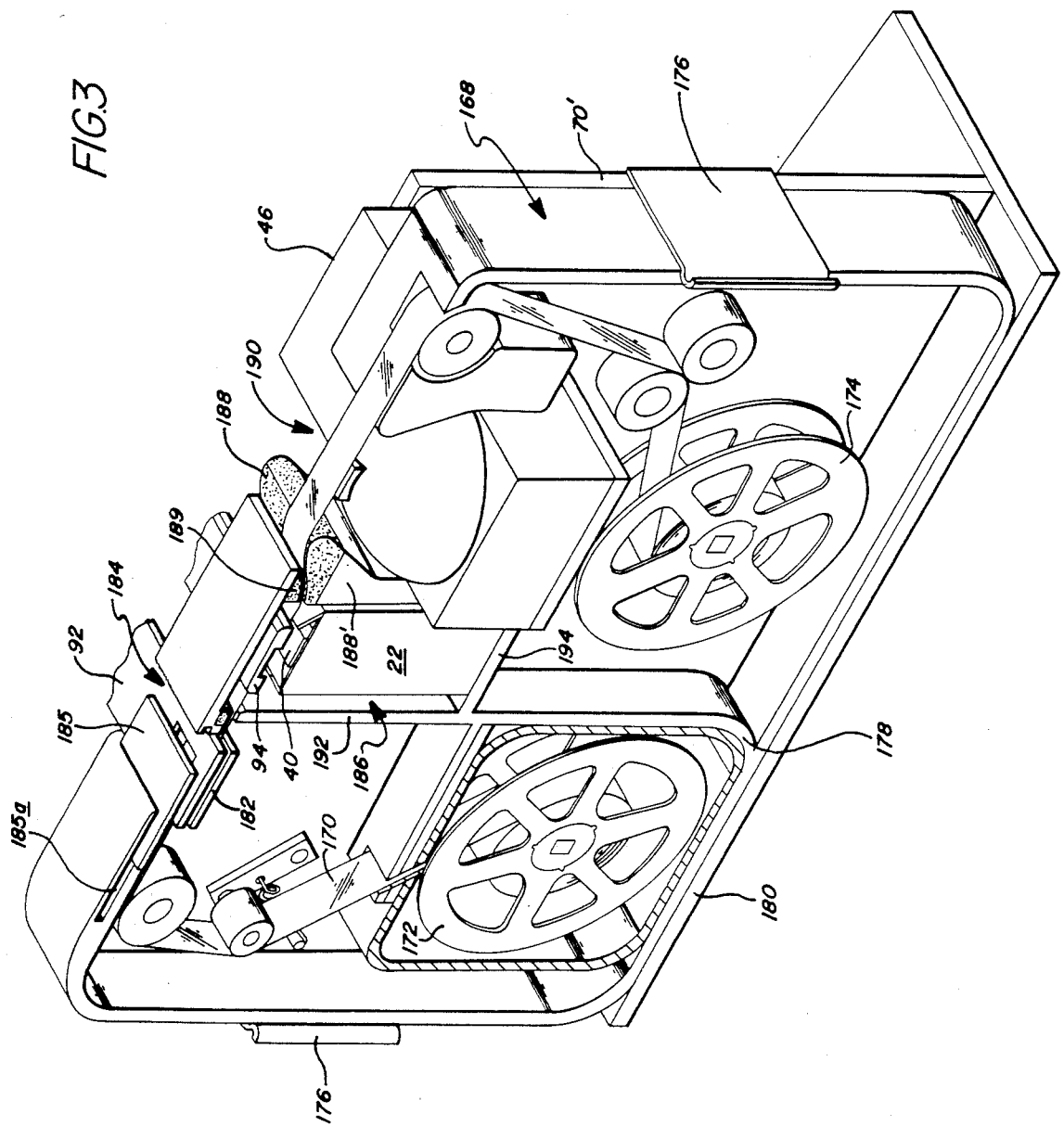

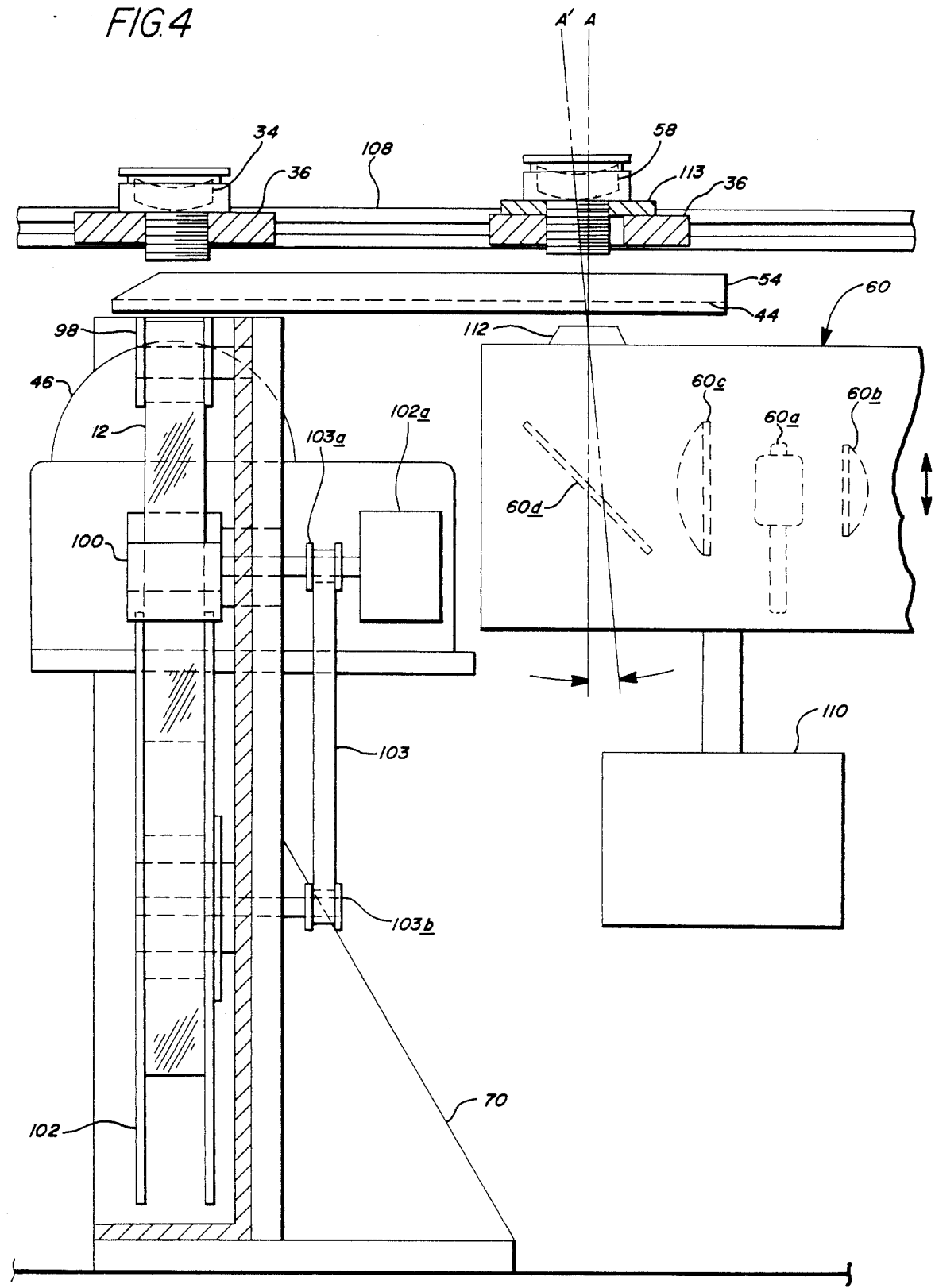

MICROFICHE RECORDING APPARATUS AND METHOD WITH STATIONARY FILM HEAD

BACKGROUND

Various types of archival microfilm recording systems are known in the prior art. The operation of these various systems is generally as follows. An image is recorded from a source in reduced (microform) size onto an intermediate or mask film, which is generally provided in the form of a film strip or roll. The intermediate film may be of the dry silver type, which produces a transparency upon development. The source can be hard copy, in which case the image is formed on the intermediate film by reflected light from the hard copy. Alternatively, the source may be a cathode ray tube or a transparency, as disclosed in U.S. Pat. No. 4,360,265 granted Nov. 23, 1982.

The latent microimage recorded on the intermediate film is developed and thereafter transferred by contact printing to an archival microform film, which usually is in the form of a microfiche film card which is a dispersion type of film. A desired frame of the microform film is imaged by flash imaging utilizing a relatively high intensity flash lamp such as a xenon flash, with the microimaged transparency functioning as a mask.

The systems of the prior art are generally constructed such that one or more of the following features are present:

(1) a single frame of the intermediate film is imaged, developed, and transferred to the archival microform film prior to imaging and/or developing the next successive frame of the intermediate film;

(2) an intermediate movable film carriage is provided that must be physically translated in order to complete an image record-image develop-image transfer cycle; and (3) the intermediate film strip must be advanced and retracted to perform multiple image record-image develop-image transfer cycles to utilize the next available frame or area of the intermediate film.

Systems having one or more of the foregoing features can result in intermediate film fogging and cycle times which are lengthened by the time necessary to move the intermediate carriage to various stations and to retract the intermediate film.

For example, U.S. Pat. No. 3,966,317, assigned to Energy Conversion Devices, Inc., discloses a dry process method and apparatus for producing archival microform records from light reflecting hard copy. A dry-process intermediate or mask film strip which is photosensitive to and imaged by light and dry developed by heat to provide imaged transparencies therein. The dry process mask film is advanced or moved to an imaging station where light is applied to the hard copy to be reflected thereby and the light image reflected from the hard copy is reduced or condensed to microimage size and applied at the imaging station. Thereafter, the dry-process mask film is advanced or moved to the developing station where the individual exposed frame of the mask film strip is heated to develop the microimage into a microimage transparency frame. Thereafter, the microimaged transparency frame is advanced to the image transferring station for imaging transferring purposes. The image contained in the microimaged transparency frame is transferred to an archival microform film which may be in the form of a microfiche or microform card.

In accordance with the method and apparatus disclosed in U.S. Pat. No. 3,966,317, a single frame of the intermediate film is exposed, then that frame of the intermediate film advanced to development, and then that frame is advanced to the image transfer station. Thereafter, in order to utilize the next available frame or area of the film and to avoid wasting significant amounts of the intermediate film, the intermediate film must be retracted or moved such that the previously microimaged transparency frame is in a position closely spaced from the imaging point in the imaging and developing station for the next cycle of operation. There are several inherent disadvantages to such an apparatus and method. Relatively long cycle times result, since for each imaging cycle the intermediate film must be advanced to each of the imaging, developing and image transferring stations and then retracted before another frame of the intermediate film can be imaged. Another drawback has to do with the nature of the intermediate film. When an image is transferred from the intermediate film to the archival microform film, which is generally a dispersion imaging film, a relatively high intensity flash is utilized with the intermediate film acting as a mask. When a relatively high intensity flash is used to transfer the microimage to the microform film, internal reflection can occur in the intermediate film. Such internal reflection can produce latent fog in the film which could become part of the next formed image in the intermediate film when it is developed at the developing station. The fogging problem can be overcome either by providing additional spacing between adjacent frames in the intermediate film or the film can be constructed to contain a barrier which prevents propagation of internally reflected light within the intermediate film. However, each barrier utilizes a short length of the film which could otherwise be used for imaging. Suitable techniques for preventing such propagation and intermediate film so modified are set forth in U.S. Pat. No. 4,360,579. Thus, in situations where the fogging problem may be present, additional processing steps or the use of modified film or greater spacing between images is required to avoid the possibility of fogging. Such internal reflection does not occur in significant amounts during imaging of the intermediate film since a relatively low intensity of light is utilized.

Another archival microform recording system is disclosed in U.S. Pat. No. 4,344,701. The microfiche recording system disclosed therein includes a traveling film head that moves along guides from the imaging station to a developing station and then to an image transfer station, where the image on an intermediate dry silver film is to be replicated onto a positive, initially opaque microfiche film card of the photo-developing type (see U.S. Pat. No. 4,137,078, issued June 30, 1979 to Izu and Ovshinsky, for a description of the microfiche film). Provision is made for annotation of the microfiche film in which a portion of the imaging station is movable on a carriage together with a read illumination assembly which must be moved and aligned in order to read from the microfiche film.

Still another archival microform recording system is disclosed in U.S. Pat. No. 4,123,157. The system disclosed therein also records reflected light from hard copy on an intermediate or mask film, which is thereafter developed by heat. A mask film carriage is provided that contains the intermediate film, and the developing station. To record an image from hard copy, the recording head is positioned over the imaging station and a particular frame of intermediate film is microimaged. The microimaged frame is then developed by applying heat to the film from the developing station, which results in a microimaged transparency. To transfer the developed microimaged transparency, the mask film carriage is then translated or moved to the image transferring station where the developed frame of mask film is positioned in desired relation to the archival microform film or card which is carried by a movable microfiche carriage where the image is recorded by flash imaging through the mask film. To perform the next cycle, the mask film must be advanced and the mask film carriage must be translated back to the imaging station and the foregoing cycle is repeated. Thus, only a single frame of the intermediate film is imaged and developed prior to image transfer to the archival microform film. Thus, the fogging problems previously discussed with respect to U.S. Pat. No. 3,966,317 are not eliminated by the apparatus disclosed in U.S. Pat. No. 4,123,157.

Provision is also made in U.S. Pat. No. 4,123,157 for reading and annotating the microfiche film in which a read illuminator is mounted on a carriage with part of the imaging station. The carriage must be moved and aligned together with the microfiche carriage to read and annotate the microfiche film.

U.S. Pat. No. 4,332,466 discloses an apparatus for high speed recording in microform from computer or other electrical signal sources. While successive frames of intermediate film are exposed and developed, the apparatus has a developing station that partially develops at least several frames at a time. No provision is made for retraction of the intermediate film after completion of a recording cycle further causing excessive use of intermediate film. While the images are transferred to a microfiche film, no provision is made for reading and/or annotating the microfiche film.

A need exists for a microform recording apparatus which eliminates the possibility of fogging the intermediate film during image transfer to the microfiche film. A need also exists for a system which does not require translation of an intermediate film carriage to complete one or more image record-image develop-image transfer cycles. Also, a need exists for a microform recording apparatus of simplified design and operation that provides for reduced cycle times and minimizes spacing of images on the intermediate film and which avoids waste of the intermediate film. Further, a need exists for a microform recording apparatus which has the capability of reading and annotating the microfiche film that is simple in design and operation.

SUMMARY OF THE INVENTION

In accordance with the present invention, a unique apparatus and method are provided for archival microform recording (usually on a microfiche card) in which a light image is recorded in microform size on an intermediate or mask film from hard copy or other source, developed and transferred to an archival microform film by contact printing. The invention is especially useful where it is desired to record a plurality of images per use of an archival microfiche card, since single frame advancement of the mask film can be effectively utilized.

The apparatus includes a stationary intermediate film head and imaging, developing and transferring stations in fixed relation to each other along the intermediate film track. Structure is provided such that successive adjacent frames or areas of the intermediate film can be individually imaged during a recording cycle in which more than one image is to be recorded and developed so that when an image is transferred from the intermediate film to the archival microform film, during such operation, the adjacent frame or frames of the intermediate film have developed images thereon except for the last image recorded during a cycle. In this manner, any light piping effects that would otherwise occur when an image is transferred to the microform film are eliminated, except at the end of a cycle, since light piping has no effect on exposed and developed intermediate film. Since the light piping effects are largely eliminated, barriers or wide spacing between images are not required and maximum spacing economy can be achieved, allowing for more efficient use of the intermediate film. The intermediate film moves in a forward direction of single frame increments when more than one image is to be recorded during a particular cycle. At the end of a recording cycle, the film is retracted to conserve intermediate film.

Preferably, the imaging, developing and transferring stations are spaced apart from each other along the film head in such a manner that the center-to-center distance between each station is a distance of an integer multiple of the center-to-center distance of adjacent intermediate film frames, with a developing station located between the imaging and transferring stations along the film head. The image transferring station utilizes a flash to transfer the image from the intermediate film and is preferably spaced from the developing station a distance greater than the distance over which light piping occurs in the intermediate film, which is less than about 1.5 inches for one type of dry silver intermediate film that has been utilized.

The light image which is recorded at the imaging station is directed thereto from a document receiving platform by means of a fixed mirror train. An exposure lens mounted on a fixed support focuses the light image in microform size onto the intermediate film. Structure is provided for retaining the intermediate film in an imaging plane during imaging at the imaging station. In one embodiment, this is accomplished by providing a fixed intermediate film backing plate over which said intermediate film traverses and which defines the plane in which the intermediate film is imaged at the imaging station. An intermediate film platen is provided above the backing plate and is reversibly movable in a direction normal to the intermediate film imaging plane from a retracted position to a position which urges the intermediate film frame during imaging at the imaging station against the backing plate.

The developing station is located along the intermediate film head between the imaging and transferring stations and individually develops the frames of the intermediate film. The developing station may utilize developing station components as disclosed in U.S. Pat. No. 4,344,701.

Because the intermediate or mask film head and imaging, developing and transferring stations are in fixed relation, no translational movement of these elements occurs during operation, allowing for faster cycle times, requiring fewer mechanical parts and eliminating many close tolerance requirements and alignment procedures such as those in the devices described in U.S. Pat. Nos.

4,123,157 and 4,344,701. Such a simplified design allows production of lower cost microform recording devices.

In accordance with another aspect of the invention, a method of microform recording is provided. The method includes microimaging and developing successive and adjacent frames or areas on a transparency-producing, intermediate or mask film strip which is susceptible to light piping and transferring the images contained therein by contact printing with radiant energy that causes light piping in the intermediate film where the next to be transferred frames of the intermediate film which are subject to light piping contain developed microimages. After the particular recording cycle is completed, the intermediate film is retracted so the next available area of intermediate film is available for imaging at the imaging station.

The stationary intermediate film head defines an intermediate film plane at the transferring station which is located above the intermediate film platen and developing structure to allow a microfiche card carriage, which carries the microfiche film, to pass freely in a plane parallel and just above the intermediate film plane at the transferring station. A backing element which is located directly above the intermediate film plane at the transferring station is provided which is movable from a retracted position to a position for contacting the frame of microfiche film to be imaged and for urging it against the selected frame of intermediate film which in turn is urged against the structure which defines the intermediate film transfer plane during image transfer.

In accordance with another apsect of the invention, a simplified read and annotate assembly can form part of the microform recording apparatus which includes a read station that is in fixed relation to the imaging station and intermediate film head. The read station utilizes a read lens preferably having a shift lens mount, and provides precision alignment of an image recorded on the microfiche film with the document or image source plane. The read lens is in fixed position and spaced apart a short distance from the exposure lens of the imaging station. The read station further includes a read illuminator which is provided to illuminate the frame of microfiche to be read. The read illuminator includes a light source and a light transparent pressure pad which may be in the form of a prism. The read illuminator is reversibly movable only in a direction normal to the microfiche film from a retracted position to a read position in which a read plane for the microfiche film is defined and in which the frame of microfiche film to be read is contacted and supported. Otherwise, the read illuminator is in fixed position. The optical axis of the read lens is shifted to allow an image to be projected from the microfiche film, through the read lens and the fixed mirror train and onto the document receiving platform in expanded normal size for viewing the same. The projected image on the document receiving platform corresponds in size and position to the size and position of the original information recorded from the document receiving platform. Thus, an image from the microfiche film can be precisely annotated merely by positioning the information to be added in a proper location on the document receiving platform with respect to the projected image, recording the new information on intermediate film and thereafter transferring the recorded image on the intermediate film to the appropriate frame of the microfiche film. The same mirror train used for imaging is utilized for reading, without any translation or movement of the read station, intermediate film head or imaging station being required.

The microfiche film is preferably carried by a microfiche card carriage which is movable to position a desired frame of the microfiche film in position at the image transferring station for transferring an image from microfiche film from the intermediate film. When the read and annotate apparatus is included, the microfiche card carriage is also movable to position a desired frame of the microfiche film between the read illuminator apparatus and the read lens. The exposure lens and fixed lens support are sufficiently spaced apart from the intermediate film platen in its retracted state to allow the microfiche card carriage and microfiche film to freely pass therebetween. This is necessary since the read lens, under which desired frames of the microfiche film must be aligned, is spaced only a short distance apart from the exposure lens so that the image projected to the document plane for reading and/or annotation utilizes the same mirror train that is used for exposure of the intermediate film.

BRIEF DESCRIPTION OF THE DRAWINGS

The present invention can be more completely understood by reference to the accompanying drawings in which:

FIG. 2 is an elevational view of the stationary intermediate film head assembly and the fixed imaging, developing and transferring stations;

FIG. 3 is a perspective view of an alternate embodiment of a stationary intermediate film head assembly;

FIG. 4 is a side elevational view of the assembly shown in FIG. 2;

DETAILED DESCRIPTION

Figure 1:
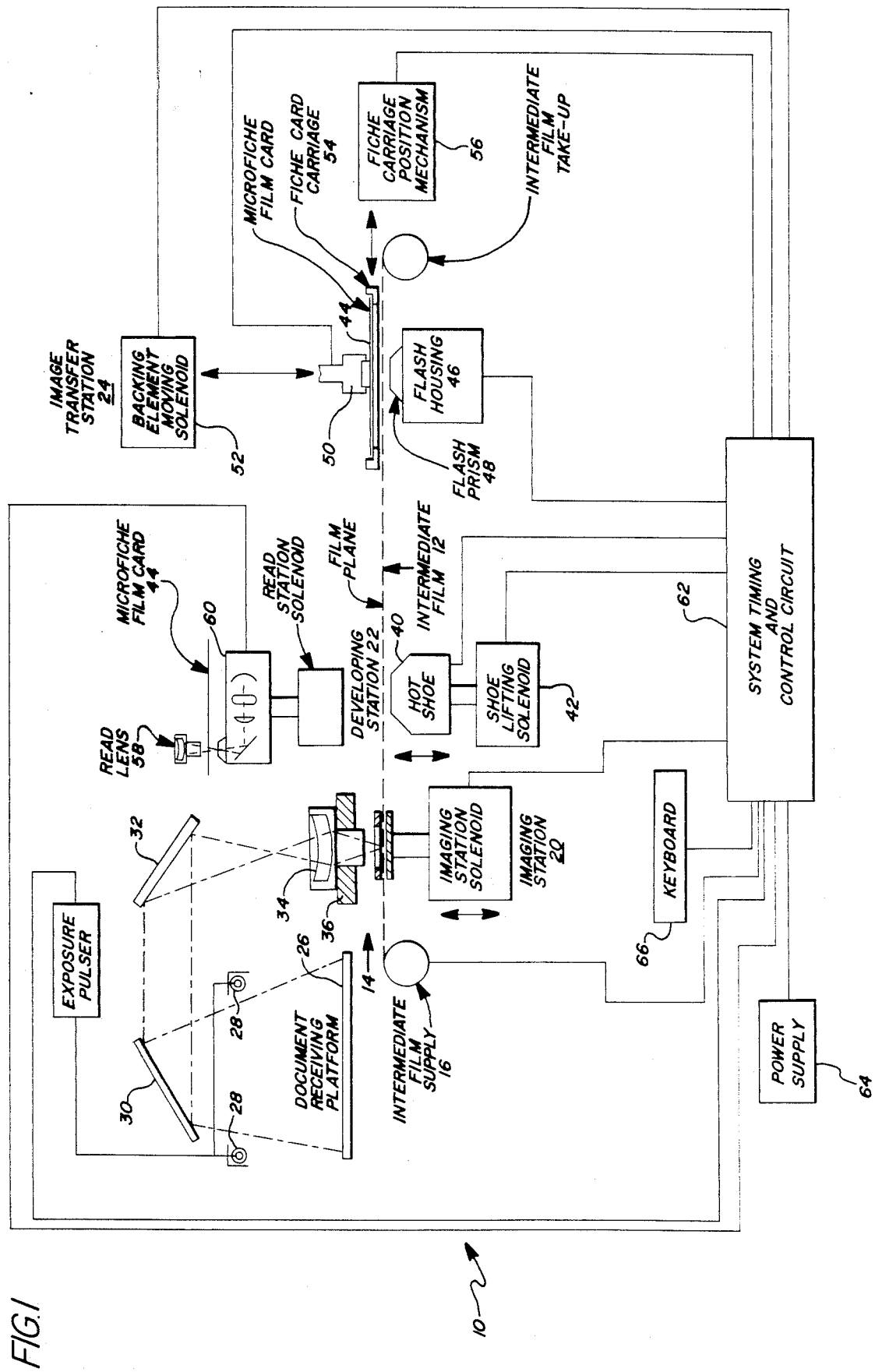
FIG. 1 is a block diagram of a microfiche recording system in accordance with the present invention.

Referring now to the drawings, and in particular to FIG. 1, there is illustrated in block diagram form the basic elements of a microfiche recording apparatus 10 in accordance with the present invention. Intermediate film 12 is supplied along an intermediate film head 14 (shown in FIG. 2) by intermediate film supply 16. Intermediate film supply 16 may be in the form of a film supply cassette 18, as illustrated in FIG. 2. Alternatively, the intermediate film supply may be incorporated into a film cassette that includes supply and take-up reels, illustrated in FIG. 3 and hereinafter described. Suitable intermediate film is known as a dry silver film developed by 3M Company and it may be like those films disclosed in U.S. Pat. Nos. 3,152,903 and 3,152,904, both of which are assigned to 3M Company. Specific types of such 3M Company films include dry silver types 784-SP, 7869 and 8210.

The intermediate film 12 is advanced to the imaging, image developing and image transfer stations, referred to respectively in the Figures by reference numerals 20, 22 and 24. Intermediate film head 14 maintains intermediate film 12 in the desired operative relation at stations 20, 22 and 24.

At imaging station 20, an initially unexposed frame or area of intermediate film 12 is exposed by a light image, such as light reflected from hard copy which may be placed on a document receiving platform 26, or from a transparency, cathode ray tube image, or combination of sources, as described in U.S. Pat. No. 4,360,265. In the case of hard copy, projection lamps 28 direct light onto the hard copy placed on document receiving platform. Lamps 26 may be fluorescent lamps which may be controlled in a manner like that disclosed in U.S. Pat. No. 4,158,253. Regardless of the light image source or sources, the image is reflected to imaging station 20 by a mirror train that includes mirrors 30 and 32 which are in fixed position. An exposure lens 34 is mounted in fixed relation to intermediate film head 14 and focuses the light image to be recorded on intermediate film 12. Imaging station 20 includes an exposure lens support 36 for supporting exposure lens 34 in a fixed relation to intermediate film head 14, and also an imaging station solenoid for maintaining in precision alignment a particular frame of intermediate film 12 during imaging thereof.

After an image is recorded at imaging station 20, intermediate film 12 is advanced along intermediate film head 14 toward developing station 22 and the next adjacent frame of intermediate film 12 is imaged. In a preferred embodiment of the invention, developing station 22 is located a distance of two microimage frames (the center-to-center frame distance being about 0.5 inch) of intermediate film 12 from imaging station 20, measured as the center-to-center distance. During operation of microfiche recording apparatus 10 where more than one image is to be recorded and transferred to a microfiche card, intermediate film 12 is advanced in single frame increments, as hereinafter described in greater detail.

When an imaged frame of intermediate film 12 reaches developing station 22, that individual frame is heat developed. Developing station 22 includes a hot shoe 40 and a shoe lifting solenoid 42. Shoe lifting solenoid 42 moves hot shoe 40, which provides developing heat, into contact with the frame of intermediate film 12 at developing station 22 that is to be developed.

After development at developing station 22, intermediate film 12 is advanced toward image transfer station 24. Such advancement occurs in single frame increments as long as certain conditions are met, as hereinafter described. In accordance with a preferred embodiment of the invention, the center-to-center distance from developing station 22 to transfer station 24 along intermediate film track 14 is four frames, or about two inches.

When an exposed and developed frame of intermediate film reaches image transfer station 24, the image contained on that frame can be transferred to a microfiche card 44. Suitable films for microfiche card 44 are disclosed in U.S. Pat. Nos. 4,082,861, 4,211,838, and 4,332,880, for example. Image transfer station 24 includes a flash housing 46, a flash prism 48 over flash housing 46, a backing element 50, a backing element translating mechanism or moving solenoid 52 for moving backing element 50 in a normal direction to and away from the intermediate film plane, a microfiche card carriage 54 and a microfiche card carriage position control mechanism 56. The various elements of image transfer station 24 cooperate to maintain the particular frame of intermediate film 12 being transferred in intimate contact with a desired frame of microfiche card 44 and flash prism 48 to allow accurate transfer of the image to microfiche card 44.

A read station may also be provided for reading the image recorded on a frame of microfiche card 44. The read station includes a read lens 58 and a read illuminator 60, which is in fixed relation relative to the imaging station 20 and intermediate film head 14. Read lens 58 is preferably mounted on fixed exposure lens support 36, spaced apart from exposure lens 34 a short distance. In one embodiment, the spacing is about 3.5 inches. Read illuminator 60 is positioned below read lens 58 to allow microfiche card carriage 54 to be positioned therebetween and provides projection of a selected frame or area of microfiche card 44 on document receiving platform 26. Read lens 58 is mounted in a manner such that the axis of the image projected through read lens 58 to be shifted to compensate for the spaced relation of exposure lens 34 and read lens 58. Thus, an image from microfiche card 44 can be projected through read lens 58 and reflected by mirrors 30 and 32 onto document receiving platform 26 for inspection, and where it is desired to annotate that particular frame, an overlay of the added information can be properly positioned over the projected image, recorded and developed on intermediate film 12 and transferred to the appropriate microfiche frame that is to be annotated. Thus, a read and annotation capability is provided without requiring imaging and/or read mechanisms which move with respect to one another.

Control of the various functions and operations of microfiche recording apparatus 10 are accomplished by a system timing and control circuit 62 to which electrical power is supplied by a suitable power supply 64. Operator input is accomplished through a keyboard 66.

Referring to FIG. 2, there is illustrated in elevational view intermediate film head 14 showing the relationship and components of imaging, developing and transfer stations 20, 22 and 24, respectively. Intermediate film head 14 and imaging, developing and transfer stations 20, 22 and 24 are in fixed relationship with respect to each other. Intermediate film head 14 supplies intermediate film 12 to imaging, developing and transfer stations 20, 22 and 24. A supply of intermediate film 12 is loaded on a supply reel 68 within film supply cassette 18 mounted on intermediate film head frame 70, and held in position between a cassette support ledge 72 and a compliant strip 74 affixed to the bottom of a top ledge 76 of frame 70. Intermediate film 12 exits cassette 18 through a light-tight slot 78 and then passes through a corresponding slot 80 in compliant strip 74 and top ledge 76. The surface of slots 78 and 80 may be covered with felt or other suitable material to facilitate the prevention of light access through the slots. A suitable motor (not shown) is utilized to retract film 12 onto reel 68. A suitable door or cover (not shown) may be mounted on hinges 81 to provide access to the interior of intermediate film head 14.

Film 12 then passes over a dancing roller 82 tensioned by a spring 84 attached to an arm 86 mounted rotatably in frame 70 also serves as an end of film sensor as described in U.S. Pat. No. 4,344,701 issued Aug. 17, 1982, which is hereby incorporated by reference. Then film 12 passes over an idler roller 88 and between an intermediate film backing plate 90 and intermediate film platen 92 which forms part of imaging station 20. Backing plate 90 is rigidly secured to frame 70 and defines the imaging plane with film platen 92. When a frame of film 12 is exposed at imaging station 20, an imaging station solenoid (not shown) moves film platen 92 from a retracted position downwardly to a position which urges the intermediate film to be exposed against film backing plate 90, which may be spring loaded to allow vertical movement. Alternatively, the clamping blade and block structure disclosed in U.S. Pat. No. 4,344,701 may be utilized or any other suitable structure or method which maintains the frame to be exposed in the imaging plane during exposure. For example, film backing 90 could be spring loaded or solenoid movable and film platen 92 could be fixed with respect to the optical system.

A shutter 93 is provided to prevent unwanted light from reaching film 12 when an image is not being recorded at imaging station 20. Shutter 93 can be solenoid operated (not shown) and is illustrated in FIG. 2 in the closed position. When an image is to be recorded, shutter 93 opens by moving laterally into slot 93a.

Figure 2A:
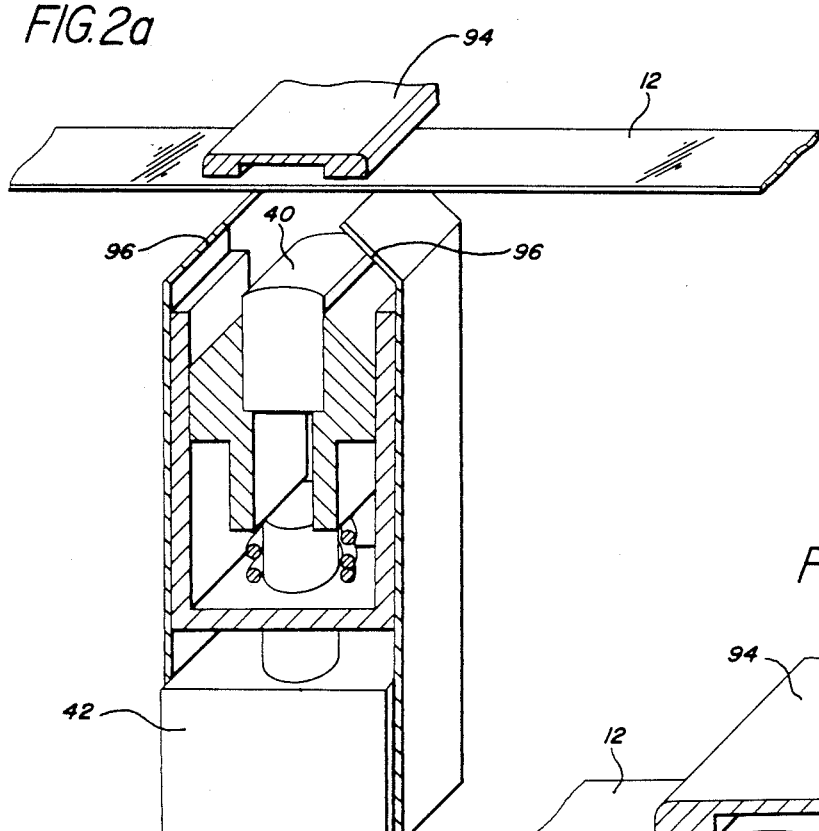
FIGS. 2a and 2b illustrate in perspective view components of the developing station.
Figure 2B:
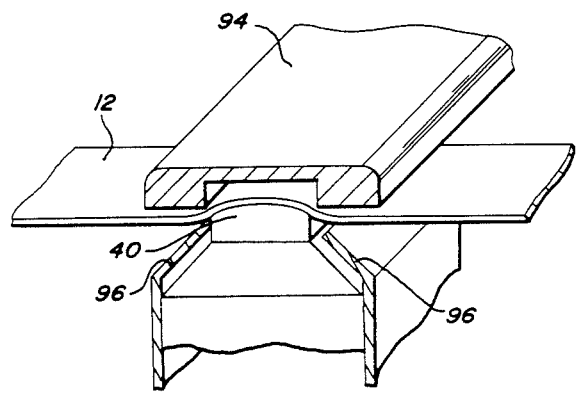

Intermediate film 12 then passes between a film developing hold down clamp 94, which is rigidly secured to frame 70, and hot shoe 40 of developing station 22, also illustrated in FIG. 2a. During development, hot shoe 40 is urged against film 12 by shoe lifting solenoid 42 allowing effective heat transfer to the frame of film 12 being developed, as illustrated in FIG. 2b. Two limit stops 96—96 limit upward motion of hot shoe 40. An electrical heating element (not shown) is utilized to heat hot shoe 40. After developing, hot shoe 40 is moved from the developing position to the retracted position by solenoid 42, as shown in FIG. 2a.

Intermediate film 12 next passes over a shoulder 97, to image transferring station 24. Shoulder 97 causes intermediate film to be located in a plane above film platen 92 and hold down clamp 94 so that microfiche card carriage 54 can move freely over film platen 92 and hold down clamp 94 while maintaining fiche card 44 parallel and in close relation to intermediate film 12 at transferring station 24. A member 97a is provided above, and is complementary to, shoulder 97 and forms a slot with shoulder 97 which preferably is light tight to prevent light from image transfer station 24 from reaching undeveloped film 12. Shoulder 97 and member 97a each may be covered with felt or other suitable material to help prevent light passage.

Intermediate film 12 next passes over idler roller 98, rollers 100 and to take up reel 102. One of rollers 100 driven by a stepper motor 102a (shown in FIG. 4 schematically) to advance film 12. A slip belt 103 is driven by motor 102a and is provided to rotate take up reel 102. Suitable pulleys 103a and 103b are provided to drive and be driven, respectively, by slip belt 103. A clutch type mechanism could be utilized in place of the slip belt arrangement described to drive take up reel 102. Alternatively, take up reel 102 could be driven by a lockable film advance motor 102a mounted on frame 70 (not shown) for advancing intermediate film 12. Supply reel 68 is driven by a lockable film tensioning motor (not shown) also mounted on frame 70 for retracting intermediate film 12.

Figure 2C:
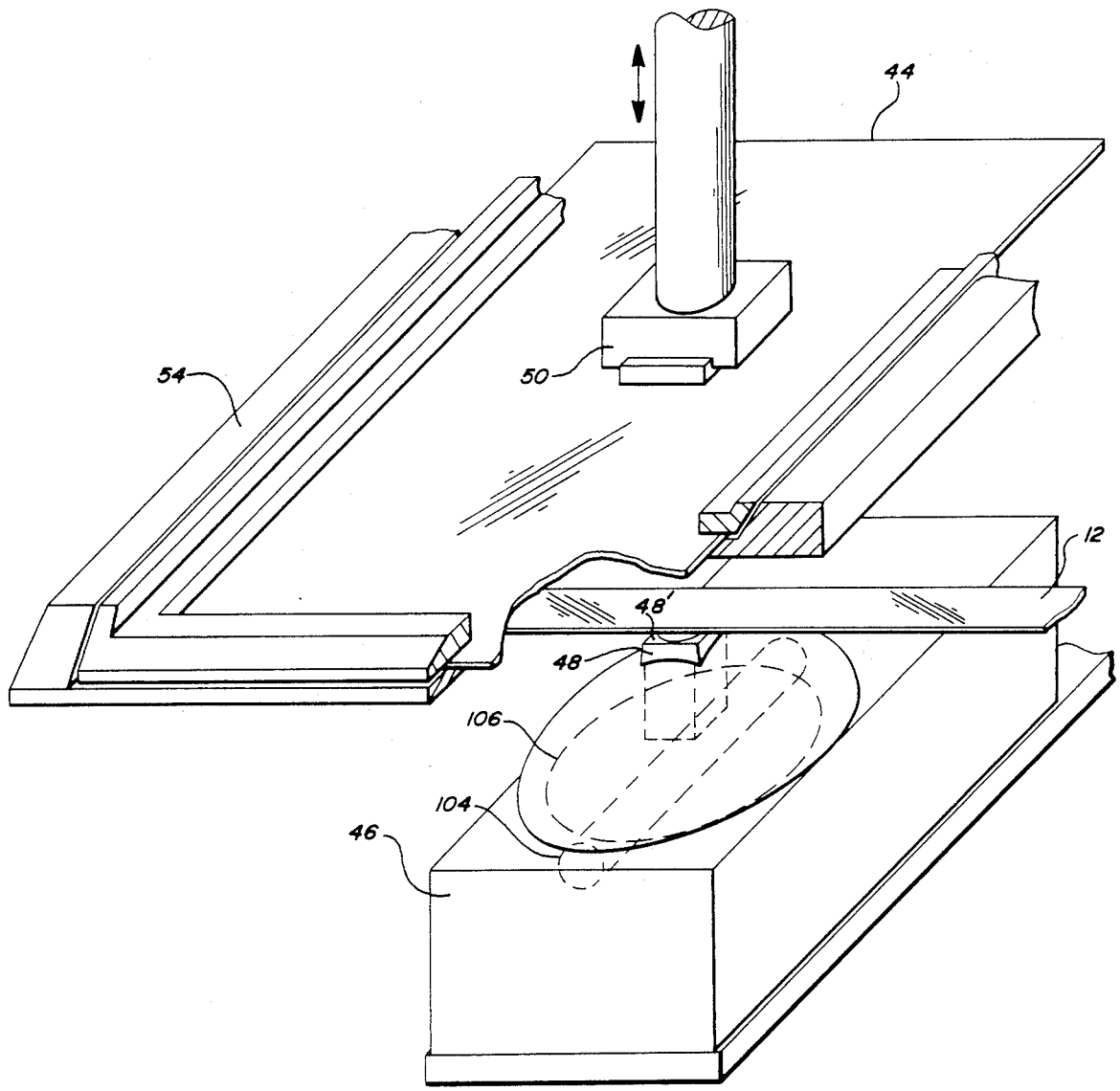
FIG. 2c illustrates in perspective view components of the image transferring station.

Referring to FIGS. 2, 2c and 4, various details of image transferring station 24 are illustrated which include flash housing 46, flash prism 48 and backing element 50. Flash housing 46, fixed to frame 70, houses a flash apparatus which provides light energy to transfer an image from intermediate film 12 to microfiche film 44. A suitable design for the flash housing optical system is disclosed in U.S. Pat. No. 4,226,523, which is hereby incorporated by reference. The flash housing optical system may include a flash tube 104 and offset hemispherical reflectors 106. Flash tube 104 may be a xenon flash tube, for example. The exposed surface 48' of prism 48 defines the transfer plane for intermediate film 12. During the transfer operation, backing element 50, which is located in line with prism 48, is urged by backing element solenoid 52 (shown schematically in FIG. 1) against a desired frame of microfiche card 44 causing it to contact intermediate film 12 and urge it against surface 48'. Then, flash tube 104 is activated and light is directed through film 12 and onto card 44 where imaging occurs.

Referring to FIG. 4, there is illustrated a side elevational view of intermediate film head 14 along lines 4—4 of FIG. 2 and illustrates the position of various components including the read station which includes read lens 58 and read illuminator 60. Preferably, and as illustrated in FIGS. 2 and 4, lens support 36, to which lenses 34 and 58 are mounted, is slidably removable from rails 108 which secure lens support 36. The read station is in fixed relation relative to intermediate film head 14 and imaging, developing and transfer stations 20, 22 and 24. A read station solenoid 110 raises read illuminator 60, causing read illuminator prism 112 to engage microfiche film card 44 during the read or annotate operation and defines the plane in which the particular frame of microfiche card 44 is read. After the read operation is completed, solenoid 110 retracts read illuminator 60.

As illustrated in FIG. 4, read illuminator includes a read lamp 60a, a reflector 60b, a focusing lens 60c and a mirror 60d. Read lamp 60a provides the necessary light to project an image on microfiche card 44 onto document receiving platform 26. Light is projected through lens 60c from lamp 60a and reflector 60b onto mirror 60d which in turn reflects it through prism 112, through microfiche card 44 to read lens 58, mounted on a shift lens mount 113, allowing translational movement of read lens 58 towards and away from exposure lens 34. Lines A and A' of FIG. 4 denote the axis of the projected image through read lens 58 before and after read lens 58 has been adjusted to provide the proper image axis to utilize mirrors 30 and 32 for projecting an image onto document receiving platform 26 which preferably corresponds in size and position to the size and position of the original information recorded from document receiving platform 26 (or to the size and position of the original recorded information had it been recorded from the document receiving platform for example, in the case of information recorded from a cathode ray tube source), so that the unrecorded areas or areas available for annotation can be precisely determined by reference to the image projected onto platform 26. Once the proper axis of the projected image lens has been achieved, read lens 58 can be secured in position in shift lens mount 113. Any structure which allows lens 58 to be slidably mounted and fixed in place after adjustment, or which provides proper alignment of lens 58 to provide the proper image axis to utilize mirrors 30 and 32, can be utilized.

Figure 13A:
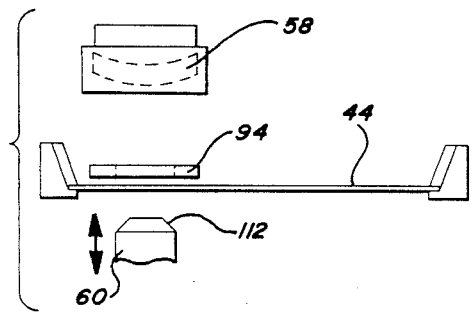
FIGS. 13a and 13b illustrate positioning and contact with the microfiche card in the read position.
Figure 13B:
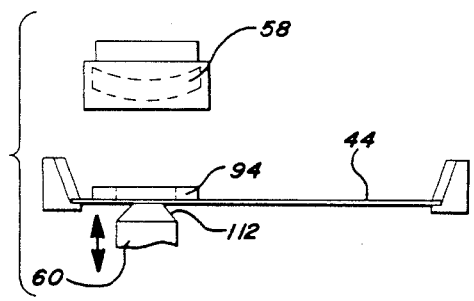

FIG. 13a shows the location of read illuminator prism 112 in the retracted position and FIG. 13b shows the engagement of microfiche card 44 during the read operation. Read illuminator prism 112 does not substantially stress the microfiche film card 44 during this process. Further aspects of the compliant tensioning system with respect to prevention of film breakage, uniform development, and suppression of image registry error during the transfer operation is the subject of U.S. Pat. No. 4,344,701 issued Aug. 17, 1982.

Figure 5:
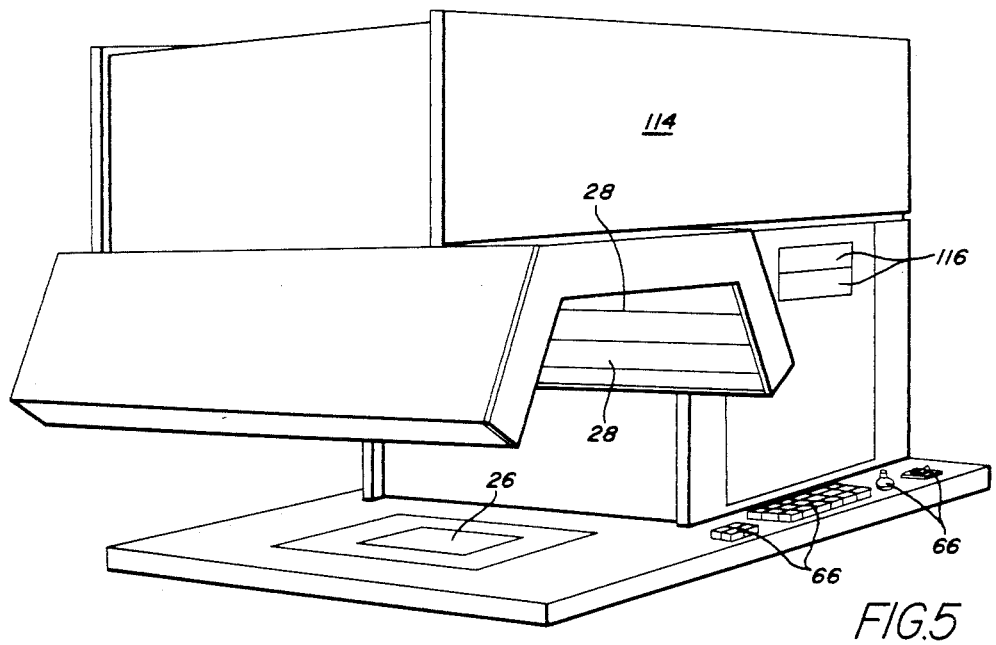
FIG. 5 is a perspective view of the cabinetry which may be utilized with the recording system.

Referring to FIG. 5, there is illustrated cabinetry 114 which can be used in accordance with the present invention, and includes a loading gate 116 for microfiche card 44, and provides structure for mounting keyboard 66, projection lamps 28 and document receiving platform 26. For a more complete description of such cabinetry, see U.S. Pat. No. 4,355,890 issued Oct. 26, 1982.

Figure 6:
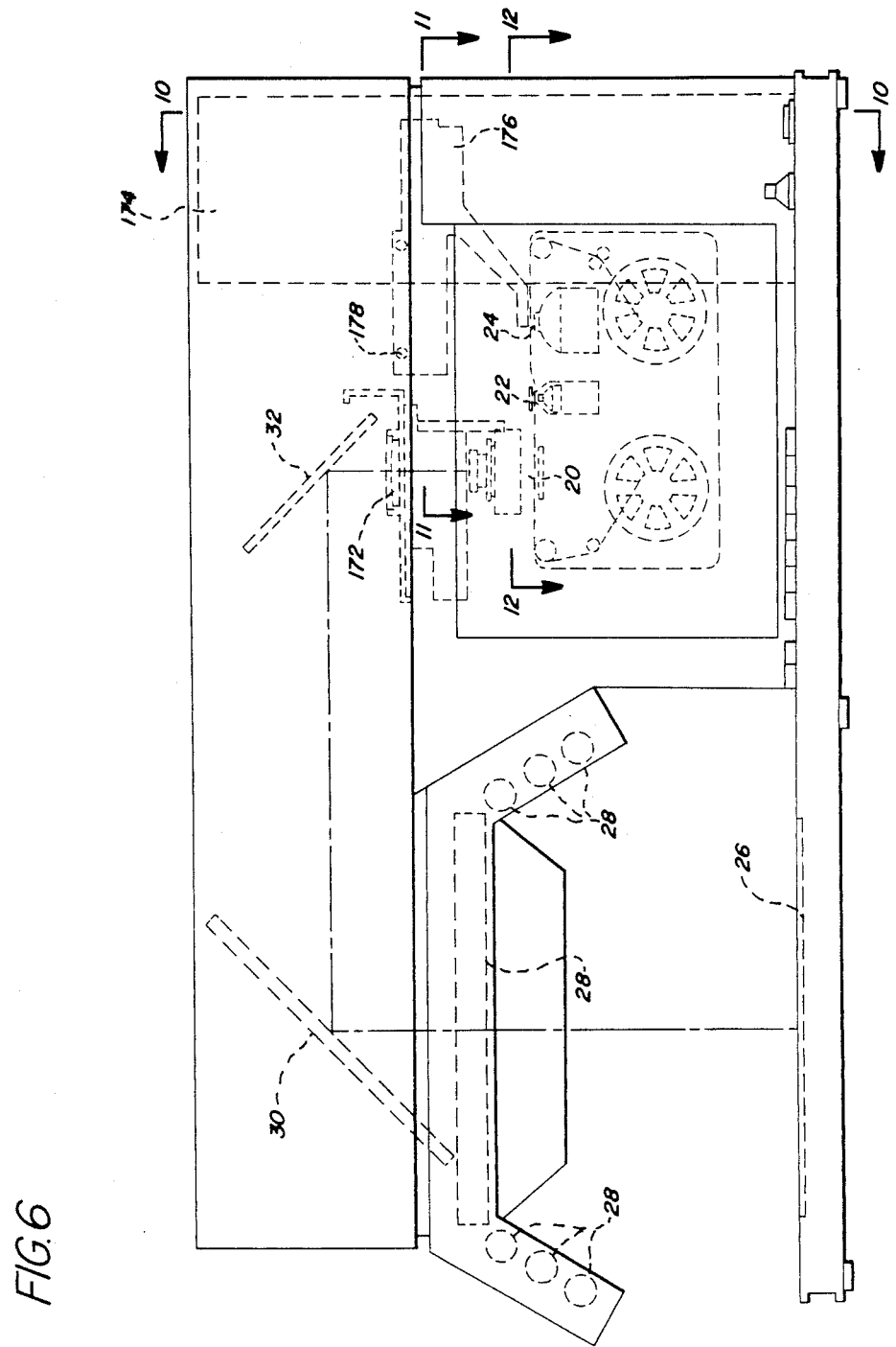
FIG. 6 is a front elevation of the cabinetry which may be used with the recording system with the loading gate region partially sectioned away illustrating the relative placement of the optical train, stationary intermediate film head assembly, and imaging, developing and transferring stations.

Referring to FIG. 6, there is illustrated a front elevational view illustrating the cabinetry which can be used in accordance with the present invention, with loading gate 116 sectioned away to show the relative placement of the stationary intermediate film head 14, mirrors 30 and 32, imaging, developing and transfer stations 20, 22 and 24, respectively, and the microfiche card carriage and carriage position mechanism.

Figure 10:
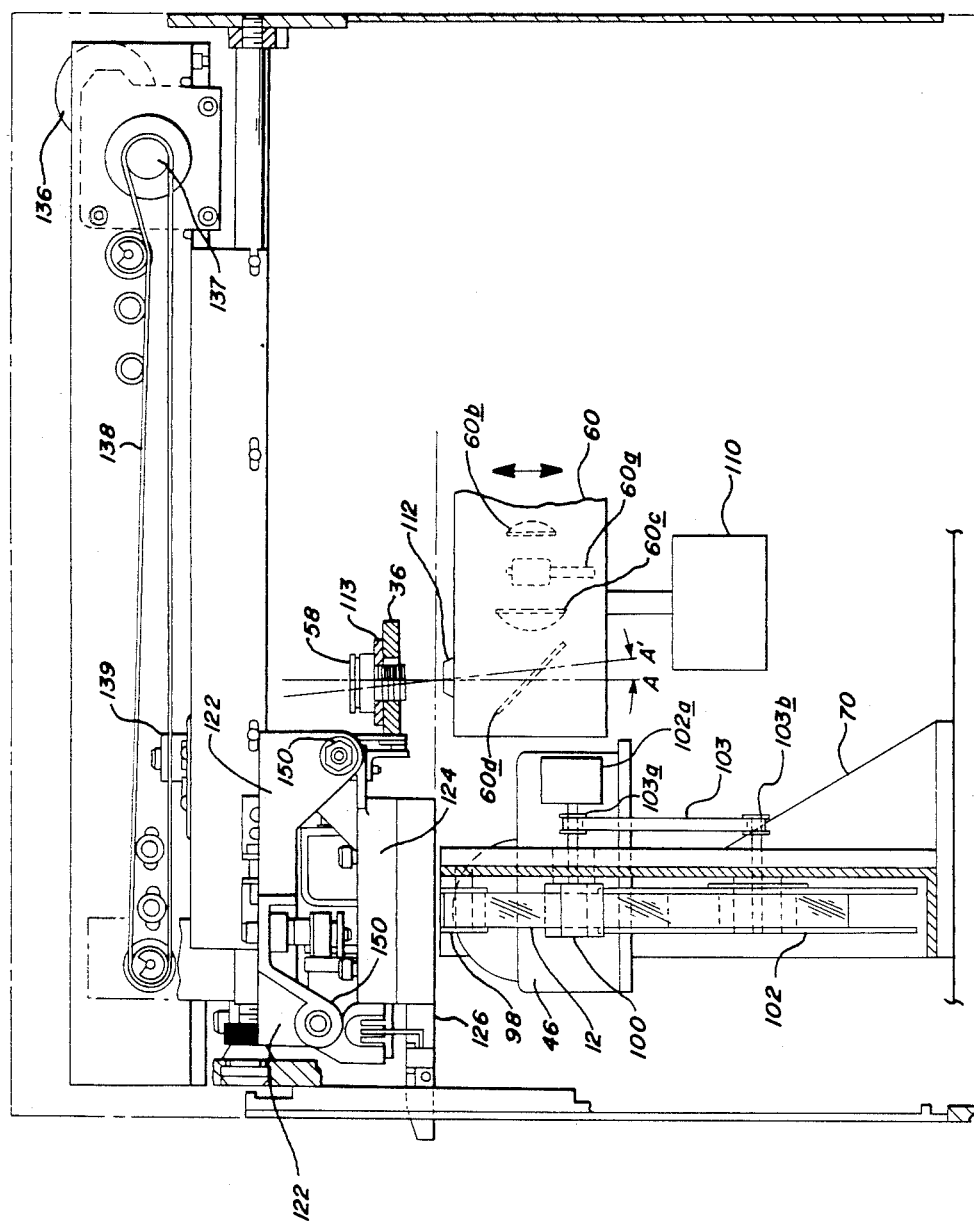
FIG. 10 illustrates a side elevation of a microfiche card carriage and positioning system.
Figure 11:
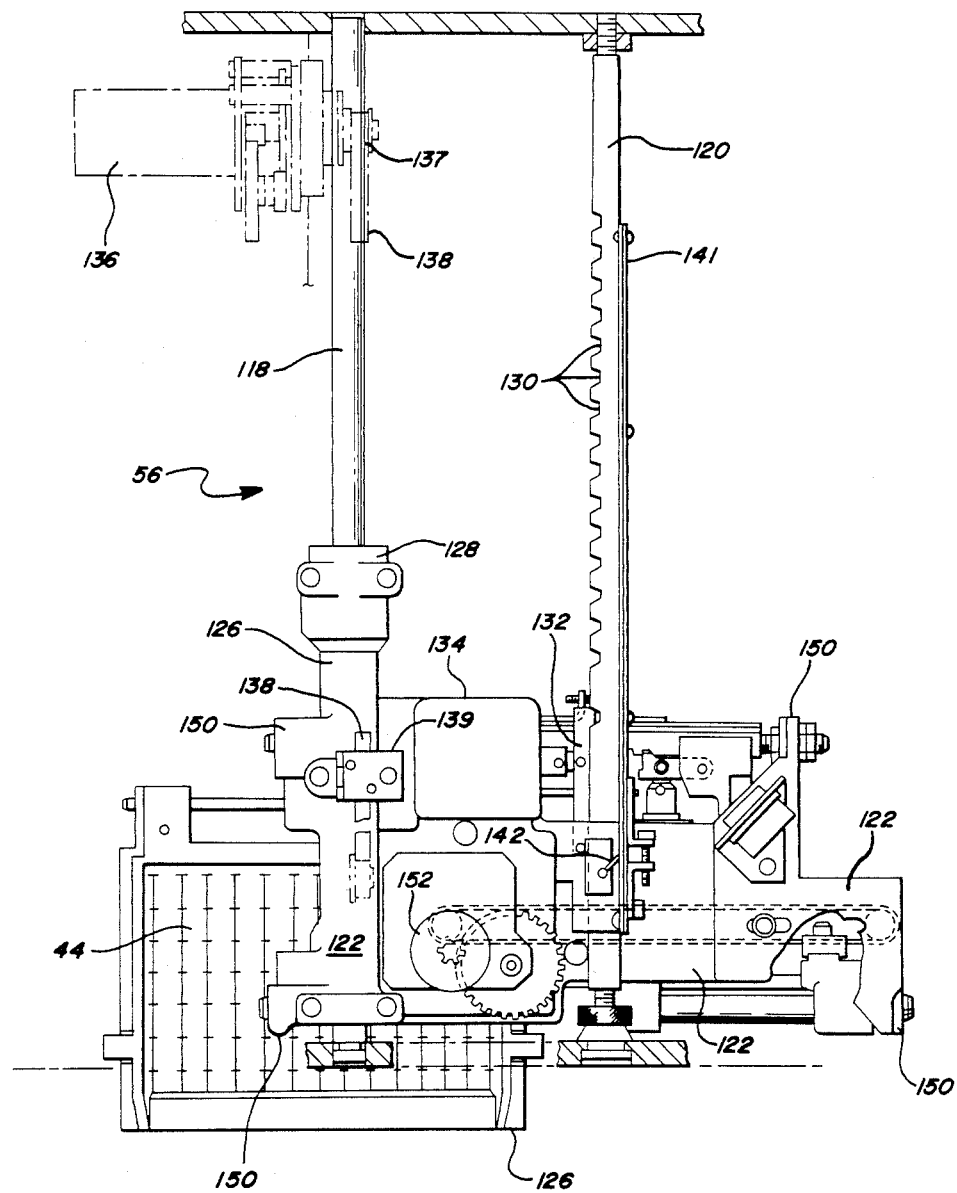
FIG. 11 illustrates a top plan view of the microfiche carriage system of FIG. 11 showing a microfiche card installed therein.
Figure 12:
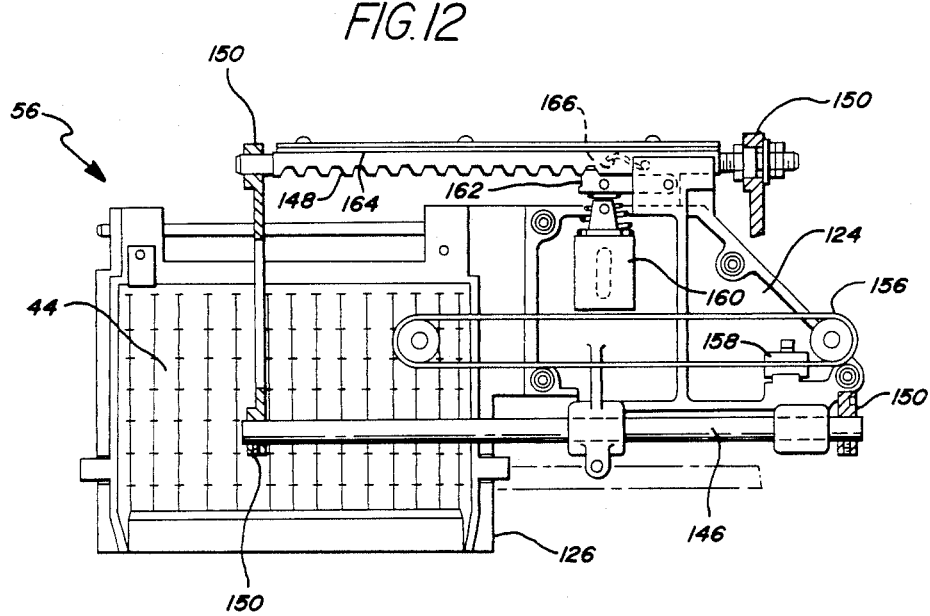
FIG. 12 illustrates a sectioned top plan view of the lower microfiche carriage assembly of FIG. 11.

FIGS. 10, 11 and 12 show details of a suitable microfiche card positioning mechanism 56. The system consists of two system support rails 118 and 120, an upper carriage assembly 122, and a lower carriage assembly 124 carrying a microfiche card holding tray 126.

FIG. 10 shows a side elevation of the microfiche carriage positioning system and also illustrates various elements previously described. FIG. 11 shows a top plan view of the microfiche carriage system showing a microfiche film card 44 installed in the card tray 126. FIG. 12 shows a sectioned top plan view of the lower carriage assembly 124. The microfiche carriage system serves to position a chosen frame of the microfiche film card 44 over the flash prism 48 for image transfer or alternatively over the illuminator output prism 112 for displaying a given microfiche frame on the document platform 26 (FIG. 1). An entry by the operator via the keyboard 66 (FIG. 1) causes the system timing and control circuit 62 to actuate the film card positioning system of FIGS. 10, 11 and 12 to place the chosen frame at the desired station. The upper carriage assembly 122 is slidably supported on the two upper support rails 118 and 120, allowing front to rear motion. The left support rail 118 is cylindrical and passes through a support bushing 128 on the upper carriage assembly 122. The right hand support rail 120 is rectangular and contains a series of indexing notches 130 selectively engageable with a locking pawl 132. Actuation of a release solenoid 134 causes the pawl to be withdrawn from engagement with the support rail 120 leaving the entire assembly free to move from front to rear. Front to rear motion is caused by actuation of an electrical drive motor 136 which drives a pulley 137 which, in turn, drives a belt 138, the belt being clamped to the upper carriage assembly 122 by means of a clamping block 139 (FIGS. 10 and 11). Front to rear motion is governed according to an optimum velocity-distance profile stored in a microcomputer in the system timing and control circuit 62. Position sensings for front to rear motion are transmitted to the system timing and control circuit by a slide wire system, which consists of a resistance strip 141 attached to the rectangular support rail 120 and a sliding contact 142 attached to the upper carriage assembly 122. Upon arrival at the addressed position, motor drive terminates and the solenoid 134 is deactivated, whereupon a return spring (not shown) moves the locking pawl 132 into engagement with the appropriate indexing notch. Velocity sensings during the head motion are derived similarly from an integral tachometer in the motor 136.

FIG. 12 is a partially sectioned top plan view of the lower carriage assembly 124. The lower carriage assembly 124 moves on two lower support rails 146 and 148 supported at their ends from the upper carriage assembly 122 by four bosses 150—150. Left-right motion of the lower carriage assembly 124 is caused by actuation of an electric drive motor 152 mounted on the upper carriage assembly 122, driving a belt 156 over two pulleys carried by the upper carriage assembly 122. Motion is imparted to the lower carriage assembly 124 via a similar clamp 158 attached to the lower frame assembly 124. A solenoid 160 actuates a locking pawl 162 in the same manner as the front to rear motion of the top carriage. Position sensings are derived from a resistance strip 164 rigidly attached to the upper carriage assembly 122 and from a sliding contact 166 attached to the lower carriage assembly 124.

Control of microfiche recording apparatus 10 is accomplished by system timing and control circuit 62 and can be similar to that disclosed in U.S. Pat. No. 4,344,701, issued Aug. 17, 1982 and U.S. Pat. No. 4,355,890, with the control system being simplified since film head 14 is stationary. Thus, it is only necessary to control transport of intermediate film 12, the imaging, developing and transfer stations 20, 22, and 24, the positioning of microfiche card carriage 54 and read system 57. In exemplary form, all sequencing and sensing operations are carried out by a program stored in a microcomputer memory, the microcomputer forming part of the system timing and control circuit 62. During a recording cycle, the intermediate film 12 is advanced in single frame increments where there is more than one frame of the intermediate film to be imaged, developed, and transferred. Thus, all the documents or other information that is to be microrecorded on a microfiche card are recorded on consecutive frames of the intermediate film, which moves only in a forward direction until the last document in a cycle has been transferred to the microfiche card. The intermediate film is then retracted so that the next available frame of intermediate film is available for imaging at the imaging station.

Figure 7A:
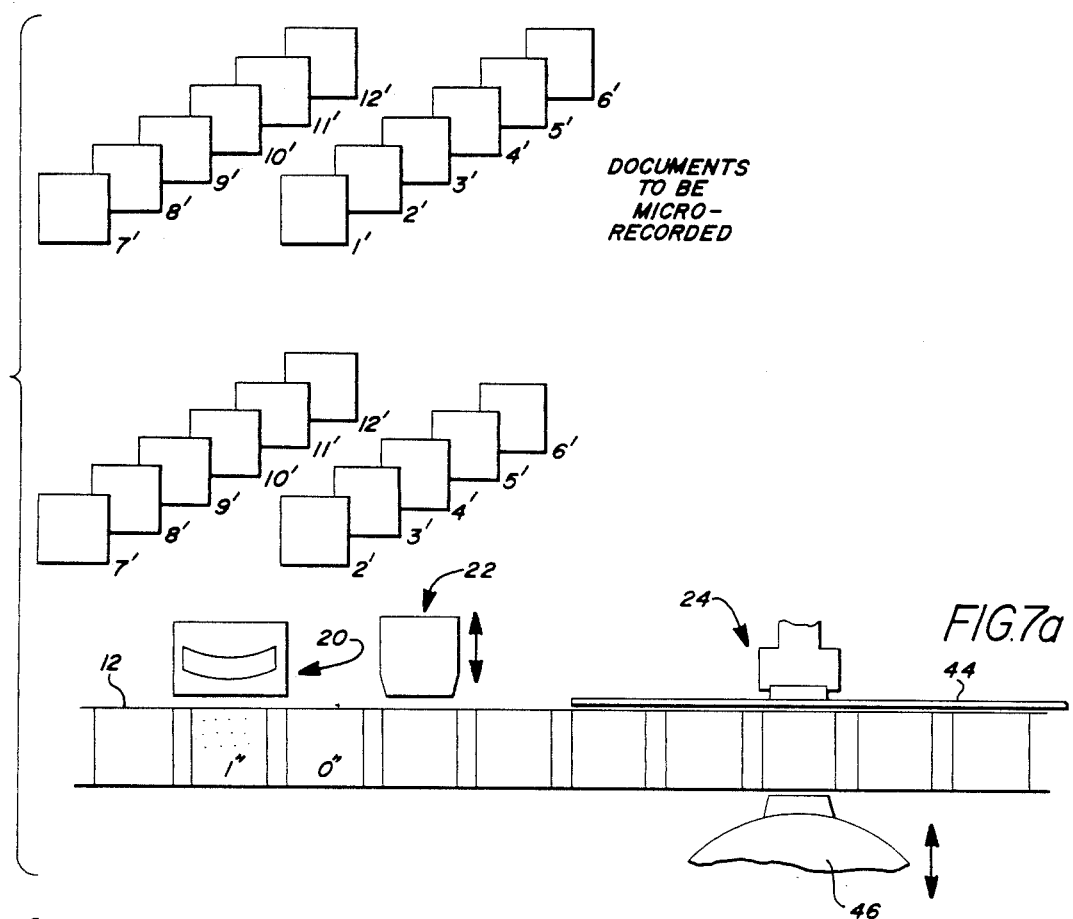
FIGS. 7a–7g are schematic illustrations showing operation of the imaging, developing and transferring stations during the beginning and middle of a recording cycle.
Figure 7B:
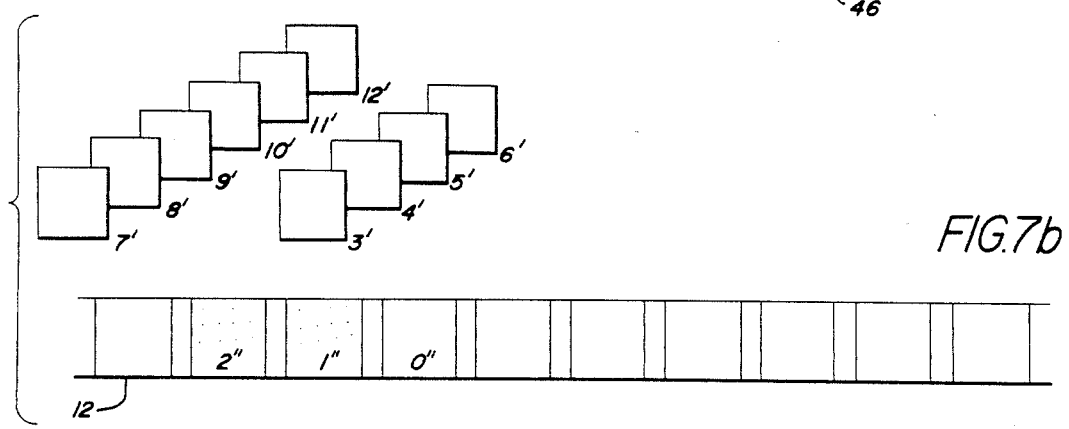
Figure 7C:
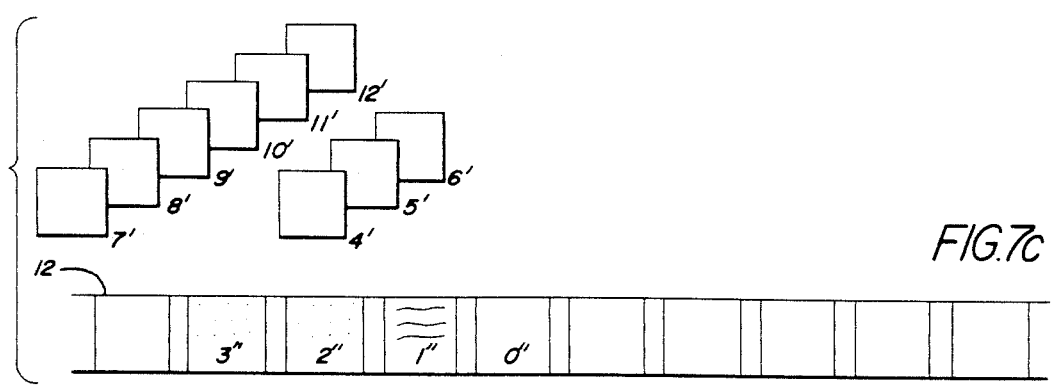
Figure 7D:
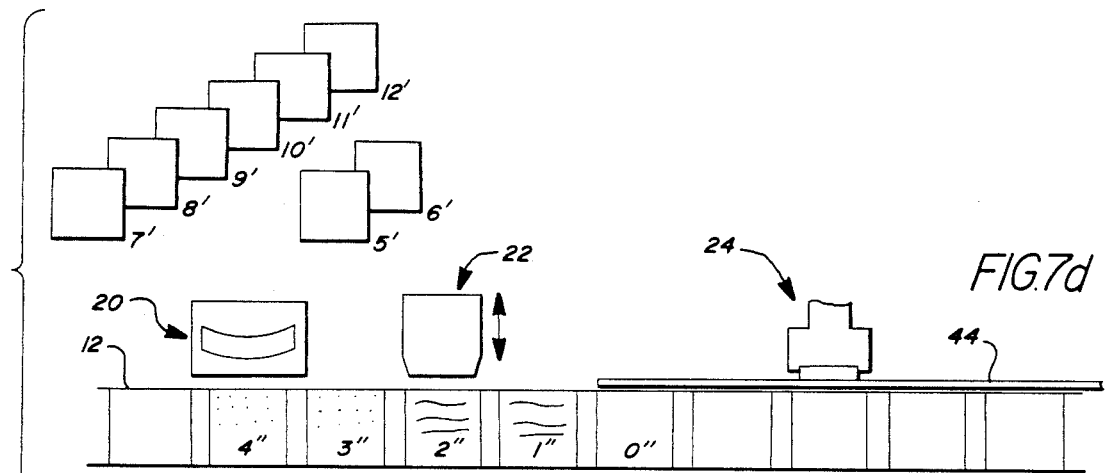
Figure 7E:
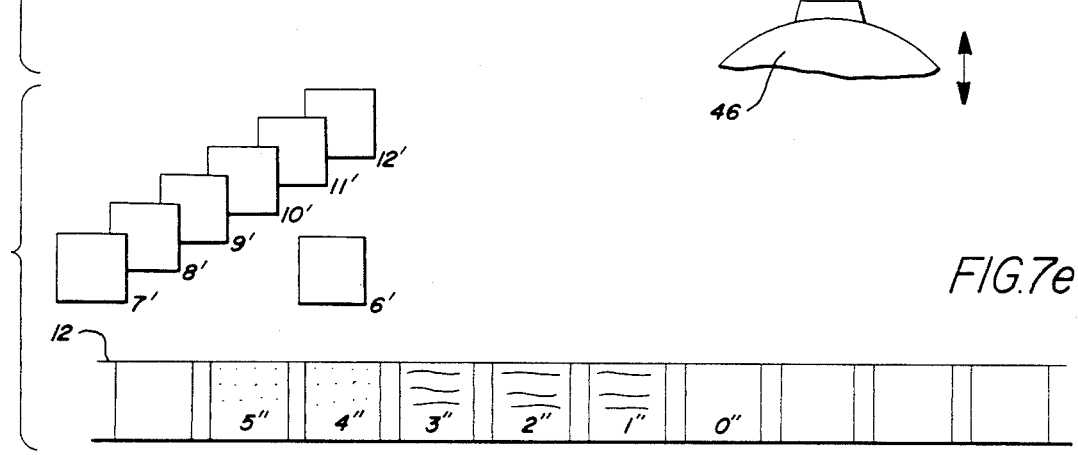
Figure 7F:
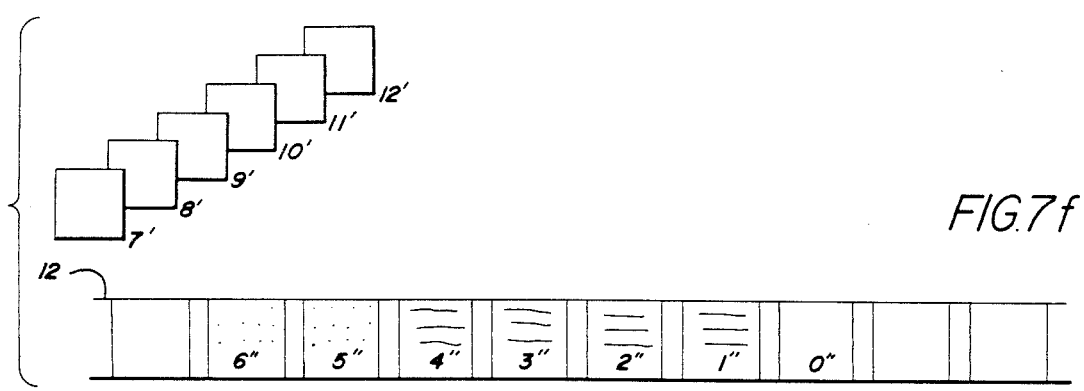

Referring to FIGS. 7a-7g, 8a-8i, and 9a-9d, the operation of microfiche recording system 10 will be described. In FIG. 7a, twelve hard copy documents are to be microrecorded on microfiche card 44. First, document 1' is placed on document receiving platform 26 and an unimaged frame 1" of intermediate film is provided at imaging station 20, where document 1' is recorded at frame 1" as a latent image. Next, intermediate film 12 is advanced one frame so that frame 2" is at imaging station 20. Document 2' is then recorded at imaging station 20 on frame 2" as indicated in FIG. 7b. Thereafter, intermediate film 12 is advanced one frame forward bringing frame 1" in position at image developing station 22 and frame 3" in position at imaging station 20. Image developing station 22 is activated by system timing and control circuit 62 which develops the image on frame 1" as illustrated in FIG. 7c. Meanwhile, document 3' is recorded at imaging station 20 on frame 3" and may occur simultaneously with the development of frame 1". Intermediate film 12 is advanced forward one frame to the position as indicated in FIG. 7d where document 4' is recorded on frame 4" and the image on frame 2" is developed. This process continues as illustrated in FIGS. 7e and 7f where documents 5' and 6' and images 3" and 4" respectively are imaged and developed at the appropriate stations.

Figure 7G:
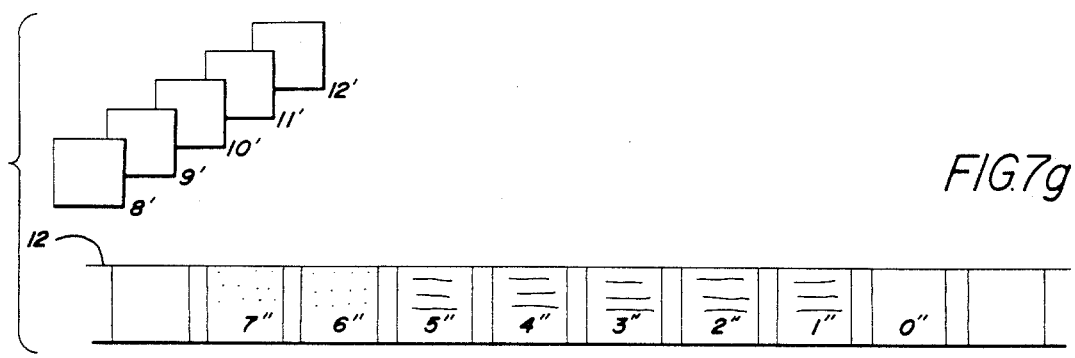

When frame 1" reaches image transfer station 24, as illustrated in FIG. 7g, image transfer station 24 is activated to transfer the image contained in frame 1" to the desired frame of microfiche card 44. The foregoing described process of imaging, developing and transferring continues until the last remaining document to be microrecorded is imaged at imaging station 20.

Image transfer at one frame can be done concurrently with image development at another frame. Image transfer can also be done concurrently with image recording if the particular frame of microfiche card 44 to which an image is being transferred is not in a location which causes fiche card carriage 54 to interfere with the optical path of imaging station 20. In FIG. 2, fiche card carriage 54 is shown in such an interfering position. System timing and control circuit 62 can be programmed to avoid actuation of imaging station 20 when fiche card carriage 54 is in such a position. Thus, at times, the imaging, developing and transferring operations can be occuring concurrently. Since imaging station 20 and developing station 22 do not have interfering positions, imaging and developing of respective frames can also be done concurrently.

Figure 8A:
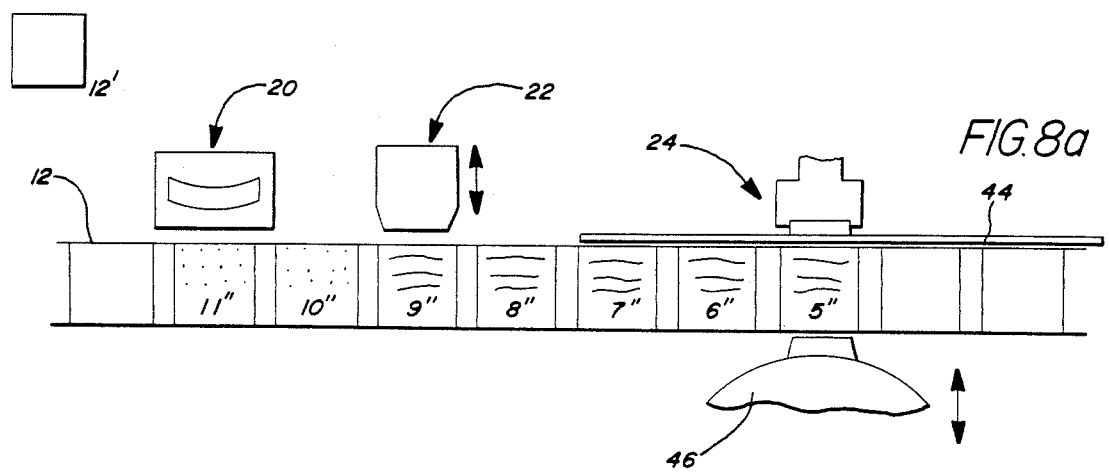
FIGS. 8a–8i are schematic illustrations showing operation of the imaging, developing and transferring stations of the recording system during the end of a recording cycle.
Figure 8B:
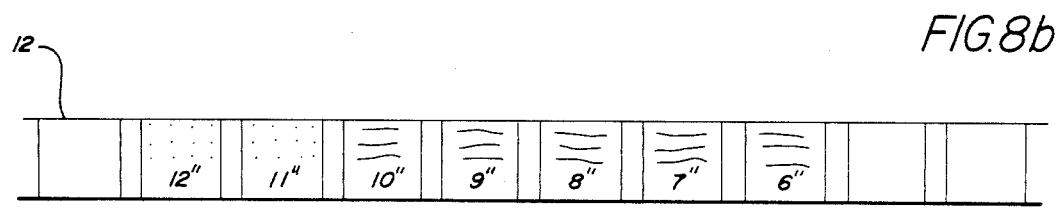
Figure 8C:
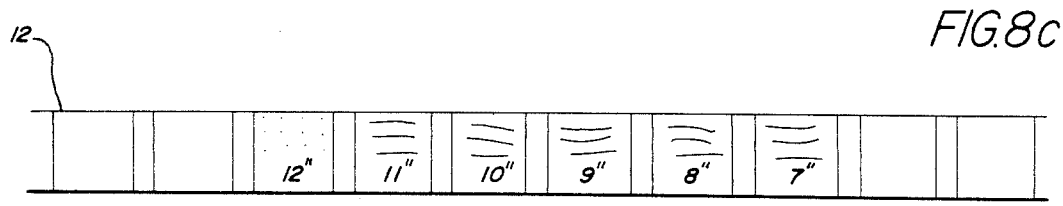
Figure 8D:
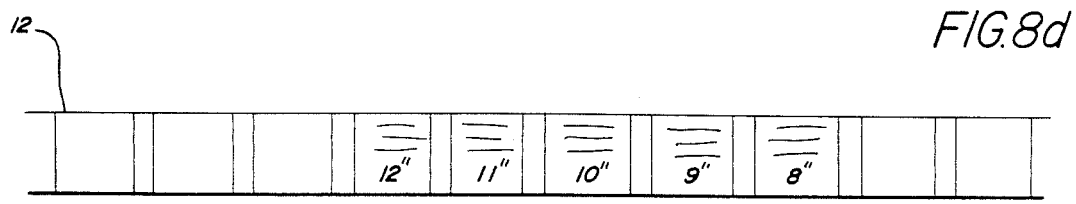
Figure 8E:
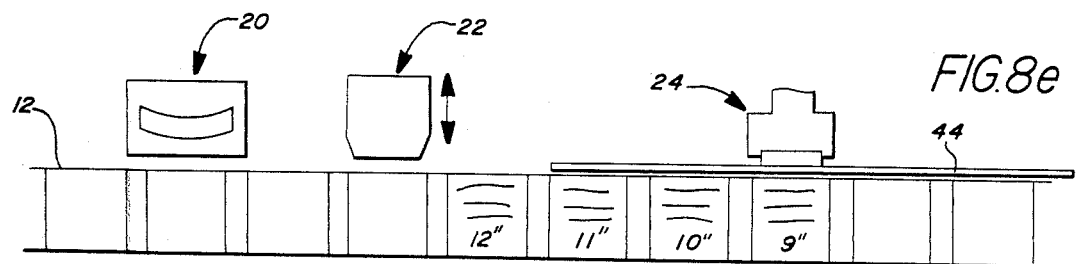

As illustrated in FIG. 8a, document 11' has been recorded at imaging station 20. In FIG. 8b, intermediate film 12 has been advanced one frame, positioning frame 12" in position at imaging station 20 where document 12' is recorded thereon. System timing and control circuit 62 can be programmed such that when the last document of a cycle has been recorded, imaging station 20 no longer functions during the remaining portion of the cycle. However, single frame advancement of intermediate film 12 continues, as hereinafter described, until the last imaged frame of the cycle, 12", has been transferred at image transfer station 24. In FIG. 8c, intermediate film 12 has been advanced one frame so that frame 7" is located at image transfer station 24 and frame 11" is located at image developing station 22. Single frame advancement of intermediate film 12 continues in FIGS. 8d-8h.

Figure 8F:
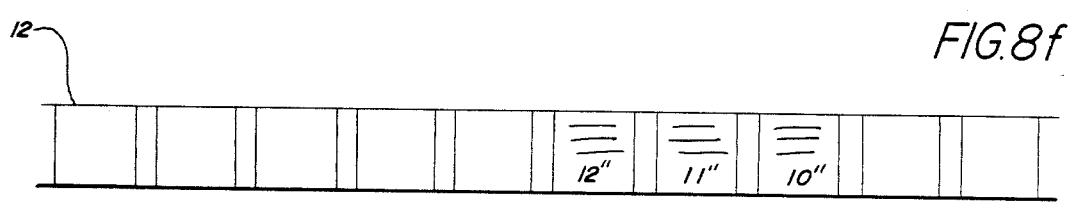
Figure 8G:
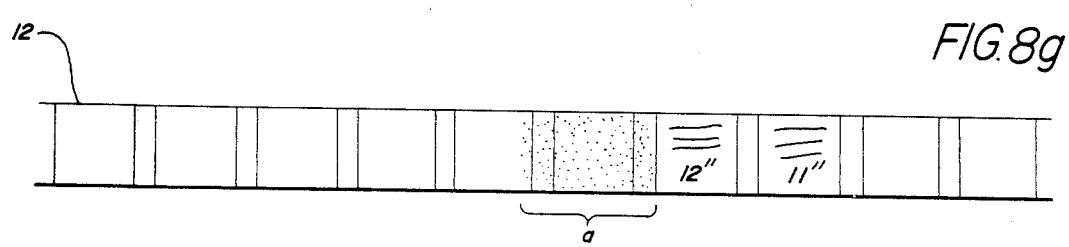
Figure 8H:
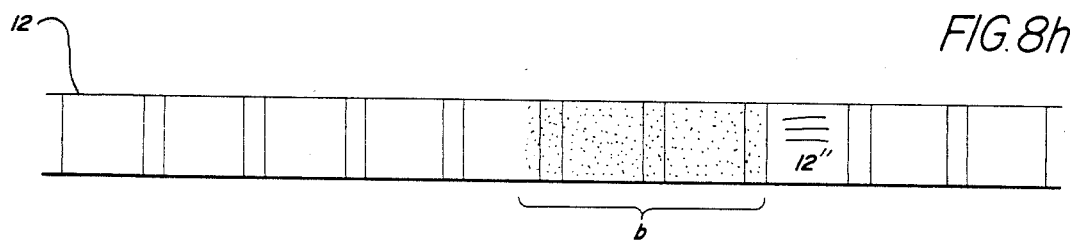
Figure 8I:
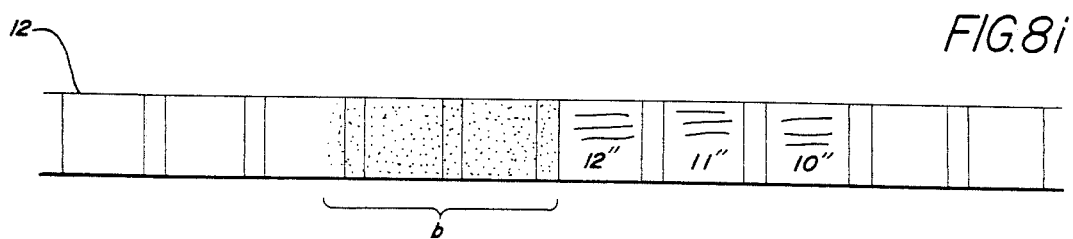

System timing and control circuit 62 is programmed such that when the last image of the cycle is developed at image developing station 22, that station ceases to function during the remainder of the cycle. In FIG. 8f, the image in frame 10" is transferred to microfiche card 44. In FIG. 8g, the image of frame 11" is transferred to microfiche card 44. In FIG. 8g, a length of intermediate film 12, indicated by reference letter "a", now contains a latent fog image as a result of the image transfer from frame 11" due to internal light piping. In FIG. 8h, the image of frame 12" is transferred and intermediate film 12 is now latently fogged over a length designated by reference letter "b". Since the latent fog over the length of intermediate film 12 denoted by reference letter "b" would become visible fog when developed, that portion of intermediate film 12 is no longer usable. Accordingly, system timing and control circuit 62 is programmed, when the last image of a particular cycle has been transferred, to retract intermediate film 12 to a position such that the next available frame of intermediate film 12 having no latent fog is utilized next at imaging station 20. For the particular film utilized in this example, the film is retracted a distance of two frames. It is to be recognized that other types of intermediate film may fog over greater or lesser distances than the film utilized in this particular example. System timing and control circuit 62 can be programmed to provide the desired amount of intermediate film retraction at the end of the cycle.

Figure 9A:
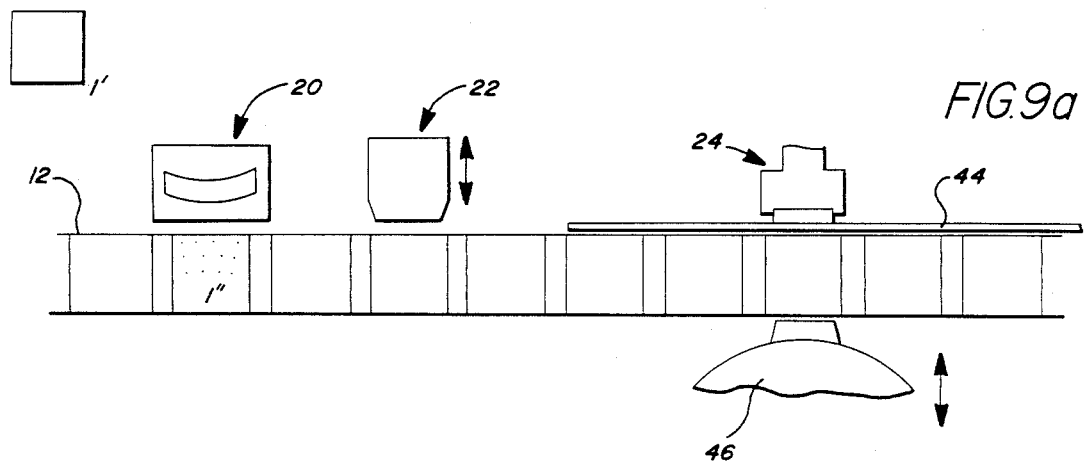
FIGS. 9a–9d are schematic illustrations showing operation of the imaging, developing and transferring stations during a single document recording cycle.
Figure 9B:
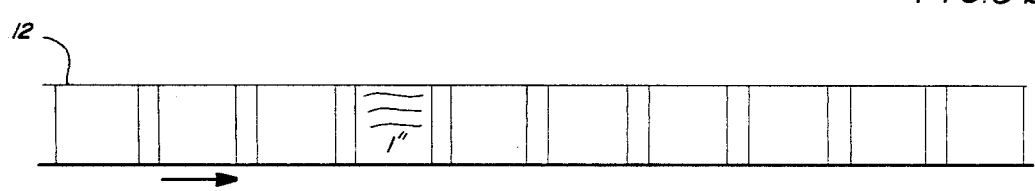
Figure 9C:
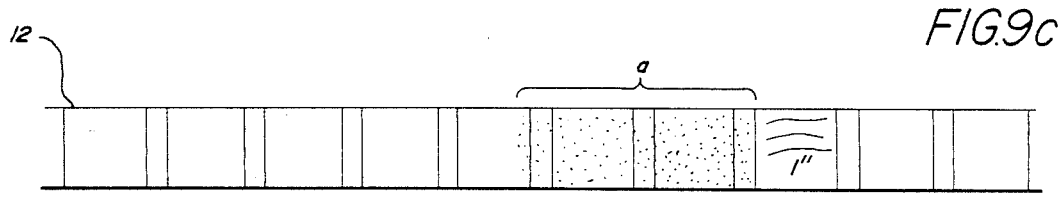
Figure 9D:
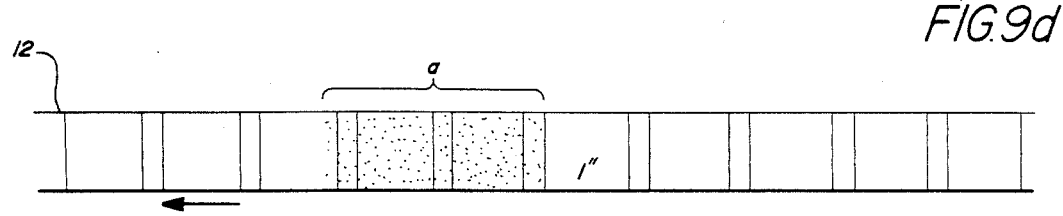

The following is the sequence that occurs in a cycle where only one document is to be recorded and is schematically illustrated in FIGS. 9a-9d. An unexposed frame 1" of intermediate film 12 is present at imaging station 20 where document 1' is recorded thereon. Since this is the only document that is to be recorded during this particular cycle, there is no need for single frame advancement and therefore system timing and control circuit 62 is programmed to advance intermediate film the requisite number of frames so that frame 1" is at image developing station 22 during the next portion of the cycle, as illustrated in FIG. 9b. There, frame 1" is developed and system timing and control circuit 62 causes advancement of intermediate film 12 to image transfer station 24 for transferring the image contained in frame 1" to a desired frame of microfiche card 44. As illustrated in FIG. 9c, such transfer latently fogs intermediate film 12 along a distance of intermediate film 12 indicated by reference numeral "a". Thus, when the cycle is completed, system timing and control circuit 62 is programmed to retract intermediate film 12 to the next available unfogged frame of intermediate film 12 as illustrated in FIG. 9d.

Referring to FIG. 3, there is illustrated a cassette 168 which functions as a stationary intermediate film head. Cassette 168 includes intermediate film 170 which is the same type of film as intermediate film 12, previously described. Intermediate film 170 is provided on a supply reel 172 and is taken up by a take-up reel 174. Cassette 168 is removably mounted on a modified frame 70' by means of clips 176 which lock cassette 168 in place. Since cassette 168 is preloaded with intermediate film 170, the operator is relieved of the necessity of threading film through the system when changing to a fresh supply of intermediate film. Frame 70' includes a lockable film advance motor and a lockable film tensioning motor (not shown) for advancing and retracting intermediate film 170.

Cassette 168 includes a frame 178, one side of which has been sectioned away to illustrate the internal assembly thereof. The bottom ledge of cassette frame 178 rests on a cassette support ledge 180, which forms part of frame 70', for maintaining cassette 168 in proper relation relative to imaging, developing and transfer stations 20, 22 and 24.

Cassette 168 may have the same roller configuration as described with respect to FIG. 2. A film backing plate 182 is mounted to cassette frame 178 to provide an imaging plane for intermediate film 170 during imaging thereof at imaging station 20 and is similar to film backing plate 90, previously described. A suitable opening 184 is provided to allow film platen 92 to be properly positioned with respect to film backing plate 182. A shutter 185 and shutter slot 185a form part of cassette 168. Shutter 185 operates in a manner similar to that described with respect to shutter 93. Shutter 185 is suitably connected to the shutter solenoid (not shown) to allow shutter 185 to be moved between the open and closed position.

Another suitable opening 186 is provided to allow proper positioning of developing station 22 with respect to intermediate film 170. Intermediate film 170 next passes over a shoulder 188 which causes intermediate film 170 to be located in a plane above film platen 92 when retracted and hold-down clamp 94 so that microfiche card carriage (not shown) can move freely over film platen 92 and hold-down clamp 94. A member 189, which is complementary to shoulder 188, forms a slot with shoulder 188 and is preferably light tight to prevent light from image transfer station 24 from reaching undeveloped intermediate film 170. Shoulder 188 and complementary member 189 each may be covered with felt or other suitable material to help prevent light passage. Another suitable opening 190 is provided to accommodate flash housing 46 and flash prism 48.

Cassette 168 includes several partitions 192 and 194 which may form part of cassette frame 178. Partition 192 serves to act as a light barrier to prevent any light from reaching the interior of cassette 168 where unexposed or undeveloped intermediate film 170 is located. The lower portion 188' of shoulder 188 also serves as a partition, as illustrated in FIG. 3, to help prevent light from reaching unexposed or undeveloped intermediate film 170.

While the invention has been described with respect to certain specific embodiments, it is understood that the invention is capable of numerous rearrangements and modifications, and it is intended to cover such rearrangements and modifications as fall within the scope of the appended claims.

I claim:

1. A dry-process microfiche recording apparatus comprising an imaging station that reduces a light image to a microsize image and records the microsize image on a frame of predetermined size of a heat developable dry process intermediate film strip, a developing station that individually heat develops the microsize image into a microsize transparency image, an image transferring station that transfers the microsize transparency image to a dry-process microfiche film, said imaging, developing and transferring stations in fixed relation to each other, an intermediate film head in stationary relation to said imaging, developing and transferring stations, said intermediate film head for guiding said intermediate film strip to said imaging, developing and transferring stations, said intermediate film head including means for single frame advancement of said intermediate film strip after a microimage is recorded at said imaging station for allowing the next adjacent frame of said intermediate film strip to be microimaged and for moving the recorded frames of said intermediate film strip in single frame increments towards said developing and transferring stations, said intermediate film head including means for retracting the intermediate film at the end of a recording cycle to make available to the imaging station for recording an image the next available area of the intermediate film strip, said imaging and developing stations spaced apart from the center-to-center of each other along said film track a distance of an integer multiple of the center-to-center distance of adjacent intermediate film frames, said developing station located between said imaging and transferring stations along said film head, said developing and said transferring stations spaced apart from the center-to-center of each other along said film track a distance of an integer multiple of the center-to-center distance of adjacent intermediate film frames.

2. The apparatus of claim 1 wherein the transferring station includes a flash apparatus for flashing light energy through a microsize transparency image and onto the dry-process microfiche film to produce an image that conforms with the microsize transparency image, said light flashing causing light piping within said intermediate film strip over a distance, said distance between said developing and transferring stations being greater than the distance of said light piping.

3. The apparatus of claim 1 wherein the center-to-center distance between said developing and transferring stations is an integer multiple from two to five times the center-to-center distance of adjacent mask film frames.

4. The apparatus of claim 1 wherein said imaging station and said heat developing station are operable simultaneously to image and develop the respective frames of said mask film that are adjacent said imaging and developing stations.

5. The apparatus of claim 1 wherein said imaging station includes an exposure lens mounted on a fixed lens support, means for maintaining a frame of intermediate film in an imaging plane at the imaging station including an intermediate film backing plate and an intermediate film platen above said backing plate for defining an intermediate film imaging plane between said film backing plate and said film platen.

6. The apparatus of claim 5 further comprising:
a read station, in fixed relation relative to said imaging station and including a read lens for reading images transferred to the microfiche film, said read lens being mounted on said fixed lens support and a read illuminator beneath and spaced apart from said read lens; and
a microfiche card carriage for carrying the microfiche film, movable to position a desired frame of said microfiche film in position at said transferring station for transferring an image thereto from said intermediate film and movable to position a desired frame of microfiche between said read lens and said read illuminator, said read illuminator including a light transparent pressure pad reversibly movable in a direction normal to said microfiche film from a retracted position to a read position for contacting and supporting the desired frame of microfiche film and for defining a read plane for the microfiche film.

7. The apparatus of claim 6 wherein said imaging station includes a fixed mirror train for reflecting an image from a document receiving platform through said exposure lens and onto said intermediate film at said imaging station, said read lens being spaced apart from said exposure lens and mounted so that the optical axis of said read lens is shifted in a manner that allows an image to be projected from said microfiche film, through said read lens and said mirror train and onto said document receiving platform in expanded normal size for viewing the same and which projected image corresponds in size and position on the document receiving platform to the size and position of the original information recorded from the document receiving platform for annotating the same with additional hard copy or light image from said document receiving platform.

8. The apparatus of claim 7 wherein said exposure lens and fixed lens support are sufficiently spaced apart from said intermediate film platen in its retracted state to allow said microfiche card carriage and microfiche film to pass freely therebetween.

9. The apparatus of claim 8 wherein said microfiche card carriage moves in a plane parallel to said intermediate film imaging plane.

10. The apparatus of claim 9 wherein said stationary intermediate film head defines an intermediate film plane at said transferring station which plane is above and parallel to said intermediate film imaging plane.

11. The apparatus of claim 1 wherein said stationary film track comprises a removable cassette which includes an intermediate supply reel, an intermediate take-up reel, a cassette frame which defines the exterior of said cassette and separate openings in said frame for accommodating portions of said imaging, developing and transferring stations therein when said cassette is in operative position with respect to said stations.

12. A dry-process microfiche recording apparatus comprising an imaging station that reduces a light image to a microsize image and records the microsize image on a frame of predetermined size of a heat developable dry process intermediate film strip, a developing station that heat develops the microsize image into a microsize transparency image, an image transferring station that transfers the microsize transparency image to a dry-process microfiche film, said imaging, developing and transferring stations in fixed relation to each other, an intermediate film head in stationary relation to said imaging, developing and transferring stations, said intermediate film head for guiding said intermediate film strip to said imaging, developing and transferring stations, said imaging station including a fixed exposure lens, a fixed read lens mounted in spaced relation from said exposure lens for reading images recorded on said microfiche film, a mirror train for reflecting an image from a document receiving platform through said exposure lens and onto said intermediate film at said imaging station, said read lens being mounted in a manner which shifts the optical axis of said read lens to allow an image to be projected from said microfiche film through said read lens and said mirror train and onto said platform receiving platform in expanded normal size for viewing the same.

13. The apparatus of claim 12 wherein additional hard copy documents or light image may be received on said document receiving platform in specific relation to the projected normal size expanded image on said document receiving platform and further comprising means for annotation of said image on said microfiche film by recording the image from said additional hard copy documents or light image on said intermediate film at said imaging station, developing the image recorded on said intermediate film at the developing station and transferring that image onto the frame of microfiche film previously projected onto the platform for annotation at the transferring station.

14. A dry process method for producing archival microform records utilizing an imaging station wherein light images are individually reduced to a predetermined microimage size and individually applied to a heat-developable, dry-process mask film strip which is photosensitive to and imaged by the light image, a developing station where heat is applied to the mask film for individual development of the light images to provide microimaged transparencies therein, wherein the microimaged transparencies in the mask film strip are individually transferred by radiant energy above a certain critical value passing therethrough to a dry-process microform film which has archival properties and which is sensitive to and imaged and developed by the radiant energy above the critical value applied thereto through the dry-process mask film strip to provide imaged microform records therein which conform to the transparent microimages in the dry-process mask film strip and which have archival properties, and which radiant energy causes a light piping condition to occur within said mask film strip of an intensity which would cause fogging in a length of mask film immediately adjacent the area of the mask film at which image transferring occurs comprising imaging and developing successive adjacent areas of said mask film strip at said imaging and developing stations during a recording cycle in which a plurality of images are recorded so that the length of mask film adjacent the image being transferred at the image transferring station over which said light piping condition occurs is microimaged with developed images to be transferred to said microform film and retracting the intermediate film at the end of the recording cycle so that the next available area of mask film is available for imaging at the imaging station.

* * * * *